US011340829B1

(12) United States Patent
Shveidel et al.

(10) Patent No.: US 11,340,829 B1
(45) Date of Patent: May 24, 2022

(54) TECHNIQUES FOR LOG SPACE MANAGEMENT INVOLVING STORING A PLURALITY OF PAGE DESCRIPTOR (PDESC) PAGE BLOCK (PB) PAIRS IN THE LOG

(71) Applicant: EMC IP Holding Company LLC, Hopkinton, MA (US)

(72) Inventors: Vladimir Shveidel, Pardes-Hana (IL); Oran Baruch, Tel Aviv (IL); Ronen Gazit, Tel Aviv (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/191,759

(22) Filed: Mar. 4, 2021

(51) Int. Cl.
*G06F 3/00* (2006.01)
*G06F 3/06* (2006.01)

(52) U.S. Cl.
CPC ............ *G06F 3/0655* (2013.01); *G06F 3/061* (2013.01); *G06F 3/0679* (2013.01)

(58) Field of Classification Search
CPC ....... G06F 3/061; G06F 3/0679; G06F 3/0655
IPC ........................................................ G06F 3/00
See application file for complete search history.

(56) References Cited

U.S. PATENT DOCUMENTS

| 9,122,589 | B1 * | 9/2015 | Bono | G06F 12/0868 |
| 9,916,244 | B1 * | 3/2018 | Tolvanen | G06F 3/0659 |
| 10,685,014 | B1 * | 6/2020 | Pleshachkov | G06F 16/2379 |
| 11,138,122 | B2 * | 10/2021 | Heng | G06F 12/0868 |
| 2018/0322050 | A1 * | 11/2018 | Thomsen | G06F 12/0868 |

* cited by examiner

*Primary Examiner* — Tammara R Peyton
(74) *Attorney, Agent, or Firm* — Muirhead and Saturnelli, LLC

(57) ABSTRACT

Write operation may be persistently recorded in a log using PDESC (page descriptor)-PB (page block) pairs. The PDESC-PB pairs of the log may be flushed. Flushing the log may include: determining a working set of PDESC-PB pairs; partitioning the working set into buckets by mapping each PDESC-PB pair of the working set to a bucket using a function; flushing a portion of the PDESC-PB pairs of a first bucket of the working set; updating, at a point in time, a first BHFS (bucket highest flushed sequence ID) value for the first bucket, wherein the first BHFS denotes a first sequence ID and each sequence ID associated with a PDESC-PB pair of the portion flushed prior to the point in time is less than the first sequence ID; and reclaiming PBs of the portion. As part of recovery processing, BHFSs for the buckets may be used to detect invalid PDESCs.

20 Claims, 8 Drawing Sheets

TECHNIQUES FOR LOG SPACE MANAGEMENT INVOLVING STORING A PLURALITY OF PAGE DESCRIPTOR (PDESC) PAGE BLOCK (PB) PAIRS IN THE LOG

BACKGROUND

Technical Field

This application generally relates to data storage.

Description of Related Art

Systems may include different resources used by one or more host processors. The resources and the host processors in the system may be interconnected by one or more communication connections, such as network connections. These resources may include data storage devices such as those included in data storage systems. The data storage systems may be coupled to one or more host processors and provide storage services to each host processor. Multiple data storage systems from one or more different vendors may be connected and may provide common data storage for the one or more host processors.

A host may perform a variety of data processing tasks and operations using the data storage system. For example, a host may issue I/O operations, such as data read and write operations, received at a data storage system. The host systems may store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device may also be provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host may be directed to a particular storage entity, such as a file or logical device. The logical devices may or may not correspond to the actual physical drives. Allowing multiple host systems to access the single data storage system allows the host systems to share data stored therein.

SUMMARY OF THE INVENTION

Various embodiments of the techniques herein may include a method, a system and a computer readable medium for processing requests comprising: receiving a plurality of write operations at a data storage system; performing first processing to record the plurality of write operations in a log, wherein the first processing includes: storing a plurality of page descriptor (PDESC)-page block (PB) pairs in the log, where each of the plurality of write operations is recorded in the log by a corresponding one of the plurality of PDESC-PB pairs, wherein for said each write operation that writes first data to a target logical address, the corresponding one of the plurality of PDESC-PB pairs includes a PB storing the first data and includes a PDESC comprising the target logical address, a pointer or reference to the PB of the corresponding one of the PDESC-PB pair, and a sequence identifier (ID); and flushing the log, wherein said flushing the log includes: determining a working set of PDESC-PB pairs, wherein the working set of PDESC-PB pairs includes the plurality of PDESC-PB pairs; partitioning the working set into a plurality of buckets, wherein each PDESC-PB pair of the working set is mapped to one of the plurality of buckets; flushing a first portion of the plurality of PDESC-PB pairs included in a first of the plurality of buckets; updating, at a point in time, a first of a plurality of BHFS (bucket highest flushed sequence ID) values for the first bucket, wherein the first BHFS denotes a first sequence ID and each sequence ID associated with a PDESC-PB pair of the first portion flushed prior to the point in time is less than the first sequence ID; and reclaiming PBs of the first portion for reuse, wherein each PB reclaimed is included in a PDESC-PB pair of the first portion. The plurality of BHFS values may be persistently stored on non-volatile storage.

In at least one embodiment, each of the plurality of BHFS values may be associated with one of the plurality of buckets, and each BHFS value associated with the one bucket may indicate that a highest sequence number of any PDESC-PB pair of the one bucket that has been flushed is less than the associated BHFS value. Each BHFS associated with the one bucket may have a value that is one more than the highest sequence number of any PDESC-PB pair of the one bucket that has been flushed.

In at least one embodiment, a hash function may be used to map each PDESC-PB pair of the working set to one of the plurality of buckets. The hash function may map a logical block address (LBA) or offset of a logical device to one of the plurality of buckets. The hash function may be used to map the LBA or offset of the target logical address of each PDESC-PB pair to one of the plurality of buckets. A metadata structure of mapping information may be used to map logical addresses to corresponding physical storage locations including content stored at the logical addresses. The metadata structure may include a plurality of levels of metadata pages. The hash function may map particular PDESC-PB pairs associated with a same metadata page of the metadata structure into a same one of the plurality of buckets. Each PB of the particular PDESC-PB pairs may include content stored at an LBA or logical address associated with the same metadata page in the metadata structure. The log may be stored on one or more non-volatile physical storage devices.

In at least one embodiment, the plurality of buckets may include a second bucket, and processing may include determining that the second bucket includes a number of PDESC-PB pairs that exceeds a maximum. Responsive to determining the second bucket exceeds the maximum, processing may be performed to partition the second bucket into a plurality of sub buckets. Processing may include persistently storing a plurality of sub bucket BHFS values wherein each of the plurality of sub buckets is associated with one of the plurality of sub bucket BHFS values. The one sub bucket BHFS value associated with said each sub bucket may denote an integer that is one more than a highest sequence ID of a PDESC-PB pair that has been flushed from said each sub bucket. H may denote a highest sequence ID of a PDESC-PB pair that has been flushed from said each sub bucket, and wherein the one sub bucket BHFS value associated with said each sub bucket may denote a next sequence ID that is greater than H in a sequence.

In at least one embodiment, the log may be stored on non-volatile storage. The data storage system may experience an event triggering recovery processing, the recovery processing may include detecting whether any of the plurality of PDESC-PB pairs of the log are inconsistent. Detecting whether any of the plurality of PDESC-PB pairs of the log are inconsistent may further comprise: reading a first PDESC-PB pair of the plurality of PDESC-PB pairs from the non-volatile storage; mapping, in accordance with a function, the first PDESC-PB pair to the first bucket; determining whether a particular sequence ID included in the PDESC of the first PDESC-PB pair is less than the first BHFS for the first bucket; and responsive to determining that the particular sequence ID is less than the first BHFS, determining that the first PDESC-PB pair is invalid. The event triggering recovery processing may be a system failure or crash.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
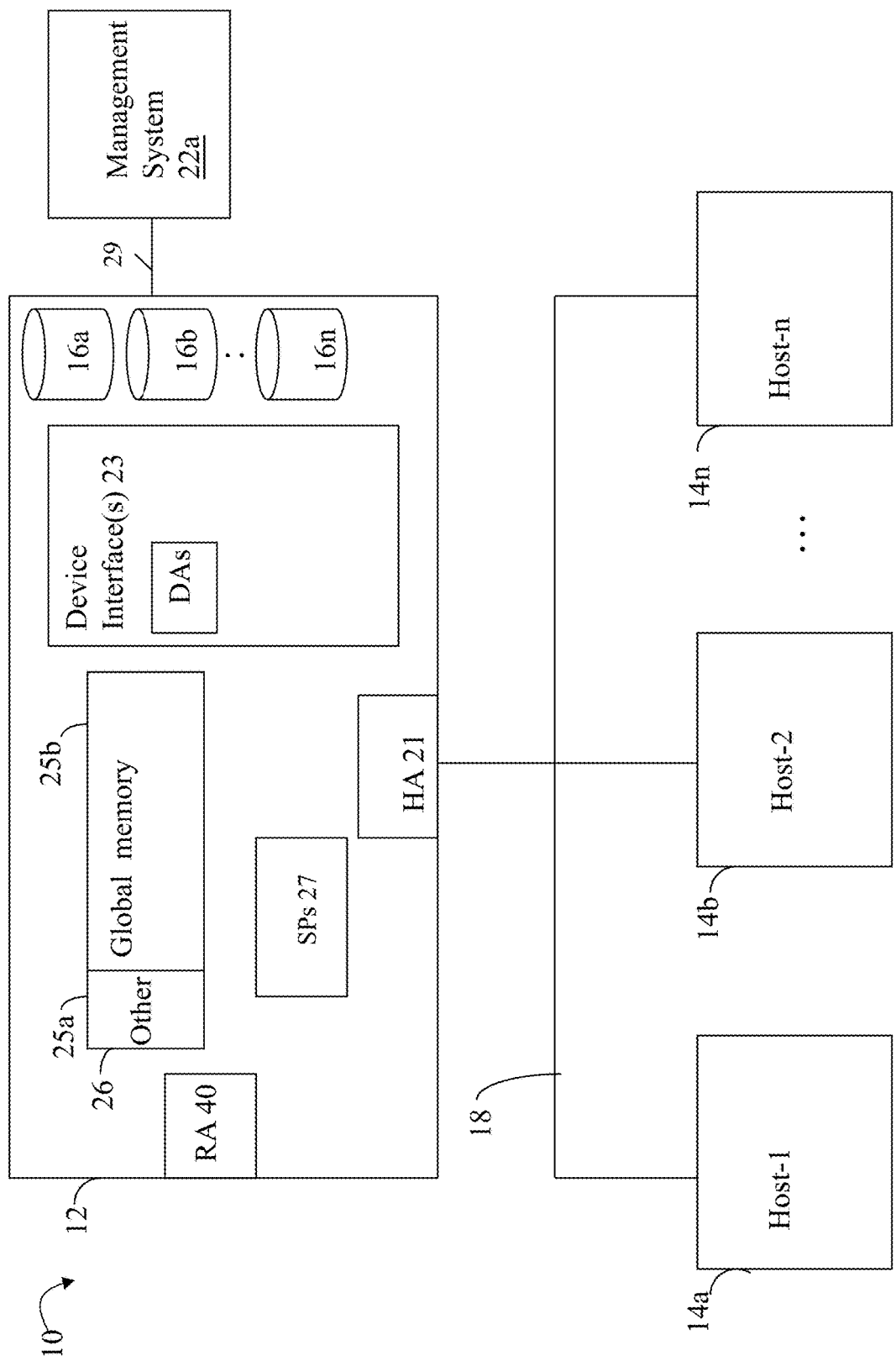
FIG. 1 is an example of components that may be included in a system in accordance with the techniques described herein.

Referring to the FIG. 1, shown is an example of an embodiment of a system 10 that may be used in connection with performing the techniques described herein. The system 10 includes a data storage system 12 connected to the host systems (also sometimes referred to as hosts) 14a-14n through the communication medium 18. In this embodiment of the system 10, the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host systems 14a-14n and data storage system 12 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the hosts 14a-14n and the data storage system 12 may all be located at the same physical site, or, alternatively, may also be located in different physical locations. The communication medium 18 used for communication between the host systems 14a-14n and the data storage system 12 of the system 10 may use a variety of different communication protocols such as block-based protocols (e.g., SCSI, Fibre Channel, iSCSI), file system-based protocols (e.g., NFS or network file server), and the like. Some or all of the connections by which the hosts 14a-14n and the data storage system 12 may be connected to the communication medium 18 may pass through other communication devices, such as switching equipment, a phone line, a repeater, a multiplexer or even a satellite.

Each of the host systems 14a-14n may perform data operations. In the embodiment of the FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although the element 12 is illustrated as a single data storage system, such as a single data storage array, the element 12 may also represent, for example, multiple data storage arrays alone, or in combination with, other data storage devices, systems, appliances, and/or components having suitable connectivity, such as in a SAN (storage area network) or LAN (local area network), in an embodiment using the techniques herein. It should also be noted that an embodiment may include data storage arrays or other components from one or more vendors. In subsequent examples illustrating the techniques herein, reference may be made to a single data storage array by a vendor. However, as will be appreciated by those skilled in the art, the techniques herein are applicable for use with other data storage arrays by other vendors and with other components than as described herein for purposes of example.

The data storage system 12 may be a data storage appliance or a data storage array including a plurality of data storage devices (PDs) 16a-16n. The data storage devices 16a-16n may include one or more types of data storage devices such as, for example, one or more rotating disk drives and/or one or more solid state drives (SSDs). An SSD is a data storage device that uses solid-state memory to store persistent data. SSDs may refer to solid state electronics devices as distinguished from electromechanical devices, such as hard drives, having moving parts. Flash devices or flash memory-based SSDs are one type of SSD that contains no moving mechanical parts. The flash devices may be constructed using nonvolatile semiconductor NAND flash memory. The flash devices may include, for example, one or more SLC (single level cell) devices and/or MLC (multi level cell) devices.

The data storage array may also include different types of controllers, adapters or directors, such as an HA 21 (host adapter), RA 40 (remote adapter), and/or device interface(s) 23. Each of the adapters (sometimes also known as controllers, directors or interface components) may be implemented using hardware including a processor with a local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from one of the hosts 14a-n. The data storage array may include one or more RAs that may be used, for example, to facilitate communications between data storage arrays. The data storage array may also include one or more device interfaces 23 for facilitating data transfers to/from the data storage devices 16a-16n. The data storage device interfaces 23 may include device interface modules, for example, one or more disk adapters (DAs) (e.g., disk controllers) for interfacing with the flash drives or other physical storage devices (e.g., PDS 16a-n). The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, the HAs and/or the RAs in a data storage array. In one embodiment, the device interfaces 23 may perform data operations using a system cache that may be included in the global memory 25b, for example, when communicating with other device interfaces and other components of the data storage array. The other portion 25a is that portion of the memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

The host systems 14a-14n provide data and access control information through channels to the storage systems 12, and the storage systems 12 may also provide data to the host systems 14a-n also through the channels. The host systems 14a-n do not address the drives or devices 16a-16n of the storage systems directly, but rather access to data may be provided to one or more host systems from what the host systems view as a plurality of logical devices, logical volumes (LVs) which may also referred to herein as logical units (e.g., LUNs). A logical unit (LUN) may be characterized as a disk array or data storage system reference to an amount of storage space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives or more generally physical storage devices. For example, one or more LUNs may reside on a single physical disk drive, data of a single LUN may reside on multiple different physical devices, and the like. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may include one or more type of device interface used in connection with facilitating data transfers to/from the associated disk drive(s) and LUN (s) residing thereon. For example, such device interfaces may include a device interface used in connection with facilitating data transfers to/from the associated flash devices and LUN(s) residing thereon. It should be noted that an embodiment may use the same or a different device interface for one or more different types of devices than as described herein.

In an embodiment in accordance with the techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

It should be noted that although examples of the techniques herein may be made with respect to a physical data storage system and its physical components (e.g., physical hardware for each HA, DA, HA port and the like), the techniques herein may be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22a that may be used to manage and monitor the data storage system 12. In one embodiment, the management system 22a may be a computer system which includes data storage system management software or application such as may execute in a web browser. A data storage system manager may, for example, view information about a current data storage configuration such as LUNs, storage pools, and the like, on a user interface (UI) in a display device of the management system 22a. Alternatively, and more generally, the management software may execute on any suitable processor in any suitable system. For example, the data storage system management software may execute on a processor of the data storage system 12.

Information regarding the data storage system configuration may be stored in any suitable data container, such as a database. The data storage system configuration information stored in the database may generally describe the various physical and logical entities in the current data storage system configuration. The data storage system configuration information may describe, for example, the LUNs configured in the system, properties and status information of the configured LUNs (e.g., LUN storage capacity, unused or available storage capacity of a LUN, consumed or used capacity of a LUN), configured RAID groups, properties and status information of the configured RAID groups (e.g., the RAID level of a RAID group, the particular PDs that are members of the configured RAID group), the PDs in the system, properties and status information about the PDs in the system, local replication configurations and details of existing local replicas (e.g., a schedule or other trigger conditions of when a snapshot is taken of one or more LUNs, identify information regarding existing snapshots for a particular LUN), remote replication configurations (e.g., for a particular LUN on the local data storage system, identify the LUN's corresponding remote counterpart LUN and the remote data storage system on which the remote LUN is located), data storage system performance information such as regarding various storage objects and other entities in the system, and the like.

Consistent with other discussion herein, management commands issued over the control or data path may include commands that query or read selected portions of the data storage system configuration, such as information regarding the properties or attributes of one or more LUNs. The management commands may also include commands that write, update, or modify the data storage system configuration, such as, for example, to create or provision a new LUN (e.g., which may result in modifying one or more database tables such as to add information for the new LUN), to modify an existing replication schedule or configuration (e.g., which may result in updating existing information in one or more database tables for the current replication schedule or configuration), to delete a LUN (e.g., which may include deleting the LUN from a table of defined LUNs and may also include modifying one or more other database tables to delete any existing snapshots of the LUN being deleted), and the like.

It should be noted that each of the different controllers or adapters, such as each HA, DA, RA, and the like, may be implemented as a hardware component including, for example, one or more processors, one or more forms of memory, and the like. Code may be stored in one or more of the memories of the component for performing processing.

The device interface, such as a DA, performs I/O operations on a physical device or drive 16a-16n. In the following description, data residing on a LUN may be accessed by the device interface following a data request in connection with I/O operations. For example, a host may issue an I/O operation which is received by the HA 21. The I/O operation may identify a target location from which data is read from, or written to, depending on whether the I/O operation is, respectively, a read or a write operation request. The target location of the received I/O operation may be expressed in terms of a LUN and logical address or offset location (e.g., LBA or logical block address) on the LUN. Processing may be performed on the data storage system to further map the target location of the received I/O operation, expressed in terms of a LUN and logical address or offset location on the LUN, to its corresponding physical storage device (PD) and location on the PD. The DA which services the particular PD may further perform processing to either read data from, or write data to, the corresponding physical device location for the I/O operation.

It should be noted that an embodiment of a data storage system may include components having different names from that described herein but which perform functions similar to components as described herein. Additionally, components within a single data storage system, and also between data storage systems, may communicate using any suitable technique that may differ from that as described herein for exemplary purposes. For example, element 12 of the FIG. 1 may be a data storage system, such as a data storage array, that includes multiple storage processors (SPs). Each of the SPs 27 may be a CPU including one or more "cores" or processors and each may have their own memory used for communication between the different front end and back end components rather than utilize a global memory accessible to all storage processors. In such embodiments, the memory 26 may represent memory of each such storage processor.

Generally, the techniques herein may be used in connection with any suitable storage system, appliance, device, and the like, in which data is stored. For example, an embodiment may implement the techniques herein using a midrange data storage system, such as a Dell EMC Unity® data storage system or a Dell EMC PowerStore® data storage system, as well as a high end or enterprise data storage system, such as a Dell EMC™ PowerMAX™ data storage system.

The data path or I/O path may be characterized as the path or flow of I/O data through a system. For example, the data or I/O path may be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receive a response (possibly including requested data) in connection such I/O commands.

The control path, also sometimes referred to as the management path, may be characterized as the path or flow of data management or control commands through a system. For example, the control or management path may be the logical flow through hardware and software components or layers in connection with issuing data storage management command to and/or from a data storage system, and also receiving responses (possibly including requested data) to such control or management commands. For example, with reference to the FIG. 1, the control commands may be issued from data storage management software executing on the management system 22a to the data storage system 12. Such commands may be, for example, to establish or modify data services, provision storage, perform user account management, and the like. Consistent with other discussion herein, the management commands may result in processing that includes reading and/or modifying information in the database storing data storage system configuration information. For example, management commands that read and/or modify the data storage system configuration information in the database may be issued over the control path to provision storage for LUNs, create a snapshot, define conditions of when to create another snapshot, define or establish local and/or remote replication services, define or modify a schedule for snapshot or other data replication services, define a RAID group, obtain data storage management and configuration information for display in a graphical user interface (GUI) of a data storage management program or application, generally modify one or more aspects of a data storage system configuration, list properties and status information regarding LUNs or other storage objects (e.g., physical and/or logical entities in the data storage system), and the like.

The data path and control path define two sets of different logical flow paths. In at least some of the data storage system configurations, at least part of the hardware and network connections used for each of the data path and control path may differ. For example, although both control path and data path may generally use a network for communications, some of the hardware and software used may differ. For example, with reference to the FIG. 1, a data storage system may have a separate physical connection 29 from a management system 22a to the data storage system 12 being managed whereby control commands may be issued over such a physical connection 29. However, it may be that user I/O commands are never issued over such a physical connection 29 provided solely for purposes of connecting the management system to the data storage system. In any case, the data path and control path each define two separate logical flow paths.

Figure 2A:
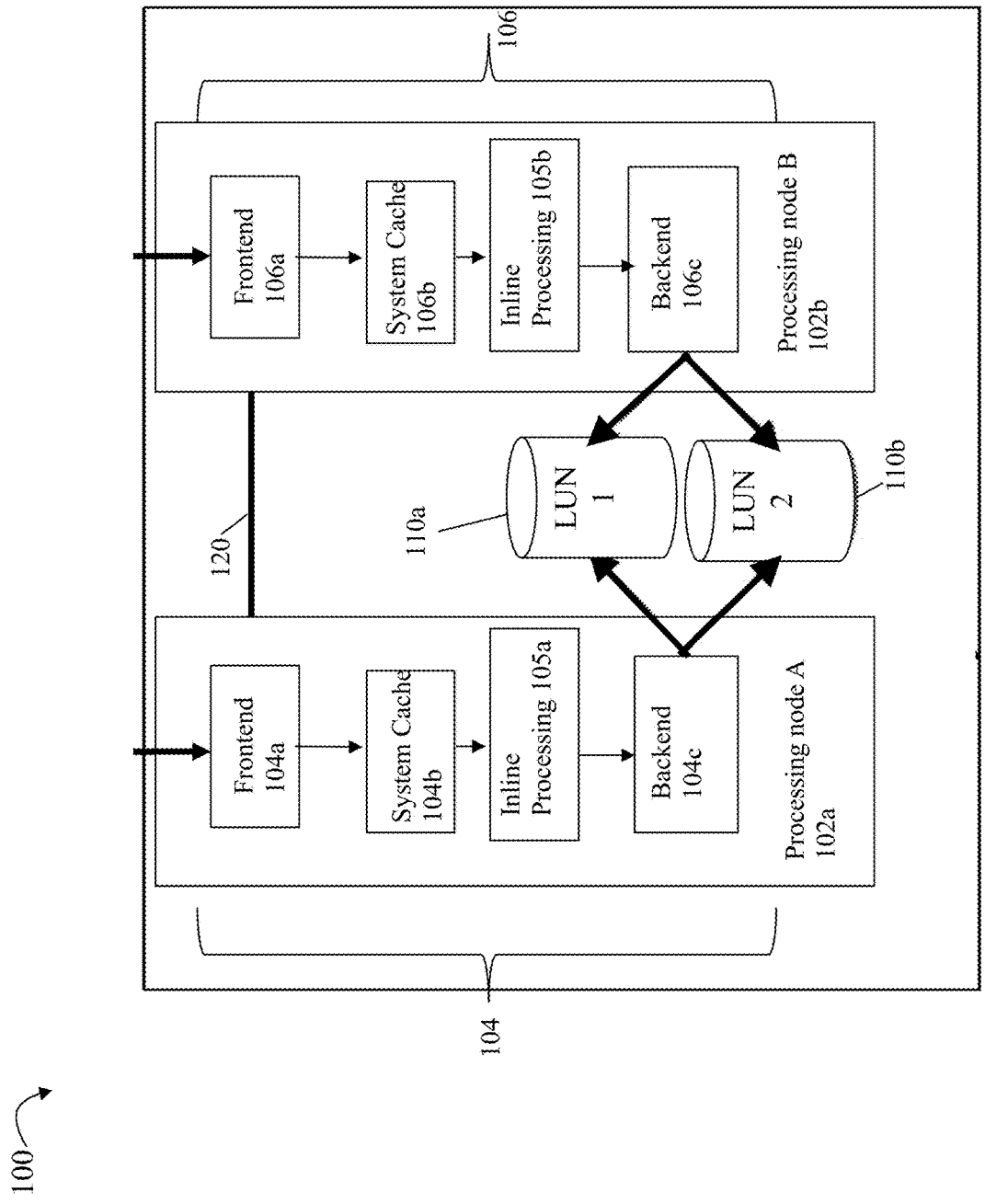
FIG. 2A is an example illustrating the I/O path or data path in connection with processing data in an embodiment in accordance with the techniques herein.

With reference to the FIG. 2A, shown is an example 100 illustrating components that may be included in the data path in at least one existing data storage system in accordance with the techniques herein. The example 100 includes two processing nodes A 102a and B 102b and the associated software stacks 104, 106 of the data path, where I/O requests may be received by either processing node 102a or 102b. In the example 200, the data path 104 of processing node A 102a includes: the frontend (FE) component 104a (e.g., an FA or front end adapter) that translates the protocol-specific request into a storage system-specific request; a system cache layer 104b where data is temporarily stored; an inline processing layer 105a; and a backend (BE) component 104c that facilitates movement of the data between the system cache and non-volatile physical storage (e.g., back end physical non-volatile storage devices or PDs accessed by BE components such as DAs as described herein). During movement of data in and out of the system cache layer 104b (e.g., such as in connection with read data from, and writing data to, physical storage 110a, 110b), inline processing may be performed by layer 105a. Such inline processing operations of 105a may be optionally performed and may include any one of more data processing operations in connection with data that is flushed from system cache layer 104b to the back-end non-volatile physical storage 110a, 110b, as well as when retrieving data from the back-end non-volatile physical storage 110a, 110b to be stored in the system cache layer 104b. In at least one embodiment, the inline processing may include, for example, performing one or more data reduction operations such as data duplication or data compression. The inline processing may include performing any suitable or desirable data processing operations as part of the I/O or data path.

In a manner similar to that as described for data path 104, the data path 106 for processing node B 102b has its own FE component 106a, system cache layer 106b, inline processing layer 105b, and BE component 106c that are respectively similar to the components 104a, 104b, 105a and 104c. The elements 110a, 110b denote the non-volatile BE physical storage provisioned from PDs for the LUNs, whereby an I/O may be directed to a location or logical address of a LUN and where data may be read from, or written to, the logical address. The LUNs 110a, 110b are examples of storage objects representing logical storage entities included in an existing data storage system configuration. Since, in this example, writes directed to the LUNs 110a, 110b may be received for processing by either of the nodes 102a and 102b, the example 100 illustrates what may also be referred to as an active-active configuration.

In connection with a write operation as may be received from a host and processed by the processing node A 102a, the write data may be written to the system cache 104b, marked as write pending (WP) denoting it needs to be written to the physical storage 110a, 110b and, at a later point in time, the write data may be destaged or flushed from the system cache to the physical storage 110a, 110b by the BE component 104c. The write request may be considered complete once the write data has been stored in the system cache whereby an acknowledgement regarding the completion may be returned to the host (e.g., by component the 104a). At various points in time, the WP data stored in the system cache is flushed or written out to the physical storage 110a, 110b.

In connection with the inline processing layer 105a, prior to storing the original data on the physical storage 110a, 110b, one or more data reduction operations may be performed. For example, the inline processing may include performing data compression processing, data deduplication processing, and the like, that may convert the original data (as stored in the system cache prior to inline processing) to a resulting representation or form which is then written to the physical storage 110a, 110b.

In connection with a read operation to read a block of data, a determination is made as to whether the requested read data block is stored in its original form (in system cache 104b or on physical storage 110a, 110b), or whether the requested read data block is stored in a different modified form or representation. If the requested read data block (which is stored in its original form) is in the system cache, the read data block is retrieved from the system cache 104b and returned to the host. Otherwise, if the requested read data block is not in the system cache 104b but is stored on the physical storage 110a, 110b in its original form, the requested data block is read by the BE component 104c from the backend storage 110a, 110b, stored in the system cache and then returned to the host.

If the requested read data block is not stored in its original form, the original form of the read data block is recreated and stored in the system cache in its original form so that it can be returned to the host. Thus, requested read data stored on physical storage 110a, 110b may be stored in a modified form where processing is performed by 105a to restore or convert the modified form of the data to its original data form prior to returning the requested read data to the host.

Also illustrated in FIG. 2A is an internal network interconnect 120 between the nodes 102a, 102b. In at least one embodiment, the interconnect 120 may be used for internode communication between the nodes 102a, 102b.

In connection with at least one embodiment in accordance with the techniques herein, each processor or CPU may include its own private dedicated CPU cache (also sometimes referred to as processor cache) that is not shared with other processors. In at least one embodiment, the CPU cache, as in general with cache memory, may be a form of fast memory (relatively faster than main memory which may be a form of RAM). In at least one embodiment, the CPU or processor cache is on the same die or chip as the processor and typically, like cache memory in general, is far more expensive to produce than normal RAM such as may be used as main memory. The processor cache may be substantially faster than the system RAM such as used as main memory and contains information that the processor will be immediately and repeatedly accessing. The faster memory of the CPU cache may, for example, run at a refresh rate that's closer to the CPU's clock speed, which minimizes wasted cycles. In at least one embodiment, there may be two or more levels (e.g., L1, L2 and L3) of cache. The CPU or processor cache may include at least an L1 level cache that is the local or private CPU cache dedicated for use only by that particular processor. The two or more levels of cache in a system may also include at least one other level of cache (LLC or lower level cache) that is shared among the different CPUs. The L1 level cache serving as the dedicated CPU cache of a processor may be the closest of all cache levels (e.g., L1-L3) to the processor which stores copies of the data from frequently used main memory locations. Thus, the system cache as described herein may include the CPU cache (e.g., the L1 level cache or dedicated private CPU/processor cache) as well as other cache levels (e.g., the LLC) as described herein. Portions of the LLC may be used, for example, to initially cache write data which is then flushed to the backend physical storage such as BE PDs providing non-volatile storage. For example, in at least one embodiment, a RAM based memory may be one of the caching layers used as to cache the write data that is then flushed to the backend physical storage. When the processor performs processing, such as in connection with the inline processing 105a, 105b as noted above, data may be loaded from the main memory and/or other lower cache levels into its CPU cache.

In at least one embodiment, the data storage system may be configured to include one or more pairs of nodes, where each pair of nodes may be generally as described and represented as the nodes 102a-b in the FIG. 2A. For example, a data storage system may be configured to include at least one pair of nodes and at most a maximum number of node pairs, such as for example, a maximum of 4 node pairs. The maximum number of node pairs may vary with embodiment. In at least one embodiment, a base enclosure may include the minimum single pair of nodes and up to a specified maximum number of PDs. In some embodiments, a single base enclosure may be scaled up to have additional BE non-volatile storage using one or more expansion enclosures, where each expansion enclosure may include a number of additional PDs. Further, in some embodiments, multiple base enclosures may be grouped together in a load-balancing cluster to provide up to the maximum number of node pairs. Consistent with other discussion herein, each node may include one or more processors and memory. In at least one embodiment, each node may include two multi-core processors with each processor of the node having a core count of between 8 and 28 cores. In at least one embodiment, the PDs may all be non-volatile SSDs, such as flash-based storage devices and storage class memory (SCM) devices. It should be noted that the two nodes configured as a pair may also sometimes be referred to as peer nodes. For example, the node A 102a is the peer node of the node B 102b, and the node B 102b is the peer node of the node A 102a.

In at least one embodiment, the data storage system may be configured to provide both block and file storage services with a system software stack that includes an operating system running directly on the processors of the nodes of the system.

In at least one embodiment, the data storage system may be configured to provide block-only storage services (e.g., no file storage services). A hypervisor may be installed on each of the nodes to provide a virtualized environment of virtual machines (VMs). The system software stack may execute in the virtualized environment deployed on the hypervisor. The system software stack (sometimes referred to as the software stack or stack) may include an operating system running in the context of a VM of the virtualized environment. Additional software components may be included in the system software stack and may also execute in the context of a VM of the virtualized environment.

In at least one embodiment, each pair of nodes may be configured in an active-active configuration as described elsewhere herein, such as in connection with FIG. 2A, where each node of the pair has access to the same PDs providing BE storage for high availability. With the active-active configuration of each pair of nodes, both nodes of the pair process I/O operations or commands and also transfer data to and from the BE PDs attached to the pair. In at least one embodiment, BE PDs attached to one pair of nodes may not be shared with other pairs of nodes. A host may access data stored on a BE PD through the node pair associated with or attached to the PD.

In at least one embodiment, each pair of nodes provides a dual node architecture where both nodes of the pair may be identical in terms of hardware and software for redundancy and high availability. Consistent with other discussion herein, each node of a pair may perform processing of the different components (e.g., FA, DA, and the like) in the data path or I/O path as well as the control or management path. Thus, in such an embodiment, different components, such as the FA, DA and the like of FIG. 1, may denote logical or functional components implemented by code executing on the one or more processors of each node. Each node of the pair may include its own resources such as its own local (i.e., used only by the node) resources such as local processor(s), local memory, and the like.

Consistent with other discussion herein, a cache may be used for caching write I/O data and other cached information. The other cached information may include, for example, cached operations or commands such as create snapshot commands. In one system, the cache may be implemented using multiple caching devices or PDs, such as non-volatile (NV) SSDs such as NVRAM devices that are external with respect to both of the nodes or storage controllers. The caching devices or PDs used to implement the cache may be configured in a RAID group of any suitable RAID level for data protection. The caching PDs form a shared cache accessible to both nodes of the dual node architecture. It should be noted that in a system where the caching devices or PDs are external with respect to the two nodes, the caching devices or PDs are in addition to other non-volatile PDs accessible to both nodes. The additional PDs provide the BE non-volatile storage for the nodes where the cached data stored on the caching devices or PDs is eventually flushed to the BE PDs as discussed elsewhere herein.

In the following paragraphs, the one or more caching devices or PDs may be referred to as a data journal or log used in the data storage system. In such a system, the caching devices or PDs are non-volatile log devices or PDs upon which the log is persistently stored.

In a data storage system, minimizing the latency of I/O requests is a critical performance metric. In at least one data storage system using the dual node architecture such as described in connection with FIG. 2A, for write operations, latency is determined by the amount of time taken to store the write data in the log where the write data is visible to both nodes or controllers of the system.

Consistent with other discussion herein, the log file may be used to optimize write operation latency. Generally, the write operation writing data is received by the data storage system from a host or other client. The data storage system then performs processing to persistently record the write operation in the log. Once the write operation is persistently recorded in the log, the data storage system may send an acknowledgement to the client regarding successful completion of the write operation. At some point in time subsequent to logging the write operation the log, the write operation is flushed or destaged from the log to the BE PDs. In connection with flushing the recorded write operation from the log, the data written by the write operation is stored on non-volatile physical storage of a BE PD. The space of the log used to record the write operation that has been flushed may now be reclaimed for reuse.

In one existing system, the write operation may be recorded in the log using different object types or structure. A first structure of the log may include records of the data written by the received write operations, and a second structure of the log may include records that are descriptors for the received write operations. For example, the write operation data may be stored in a record of the first structure in the log. Additionally, a descriptor for the write operation may be stored in a record of the second structure in the log, where the descriptor may reference a record in the first structure including the write data written by the write operation. In one existing system, both the first structure and the second structure may be ring buffers. Ring buffers are generally known in the art. A ring buffer is a ring of records or entries. The ring buffer may be maintained using pointers, such as a head pointer and a tail pointer, where new entries of the ring may always be allocated from the head and space reclamation may always be done from the tail. When an entry at the tail is flushed, the entry may be freed and thus reclaimed for reuse. The tail may be advanced as entries are flushed. In a similar manner, as entries are allocated, the head pointer is advanced.

Figure 2B:
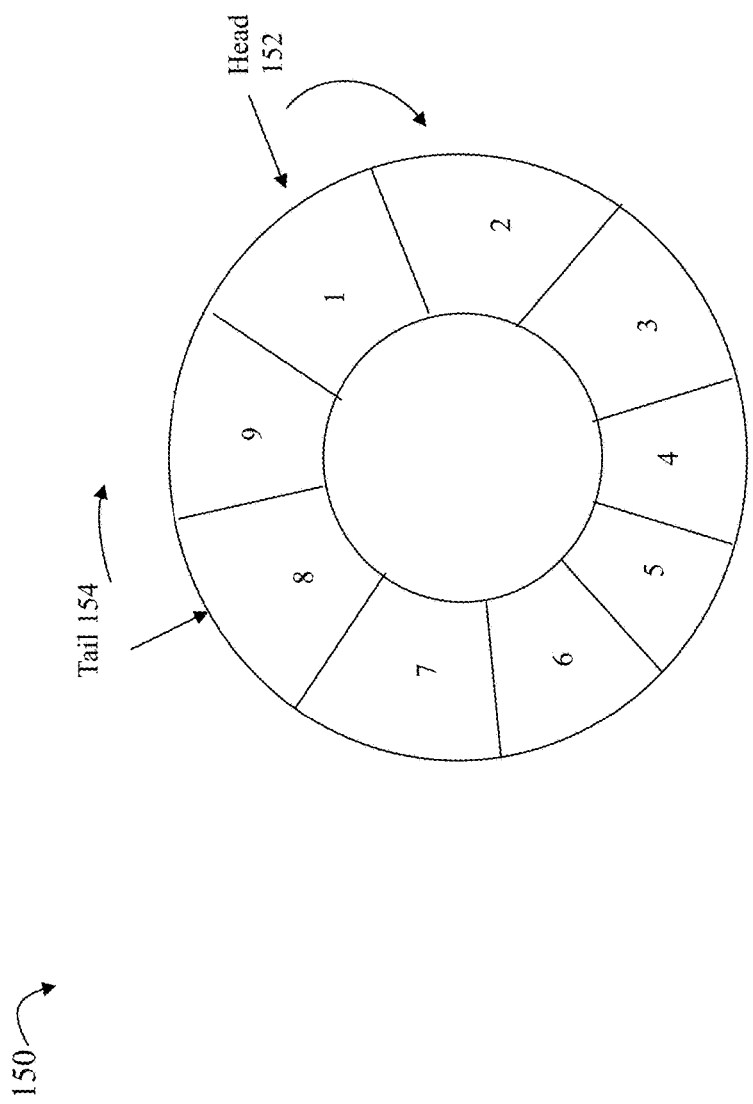
FIG. 2B is an example illustrating a ring buffer.

Referring to FIG. 2B, shown is an example 150 illustrating a ring buffer. The ring buffer 150 may be managed using the head pointer 152 and the tail pointer 154. Both pointers are advanced in the clockwise flow in this example. Entries are allocated from the head of the list as denoted by the head pointer 152. For example, the entry 1 may be allocated by the head pointer 152. Subsequently, the head pointer 152 is advanced to the entry 2 since entry 2 is the next entry to be allocated when needed. The tail pointer 154 may denote the entry in the ring buffer that is to be flushed next or is currently being flushed. For example, the tail pointer 154 is currently pointing to entry 8. Once entry 8 is flushed, the tail pointer 154 is advanced to entry 9 that is flushed. The ring buffer allocates new entries in a FIFO (first in first out) manner from the head pointer based on the sequential positioning in the buffer as denoted by the entry numbers 1 through 9. In at least one embodiment for ring buffer management, both the "full" and "empty" cases of the ring buffer may look the same where the head pointer 152 and the tail pointer are equal or point to the same entry in the ring buffer. In the full case, all entries in the ring buffer are allocated and in the empty case, all entries in the ring buffer are free or available for use. Any suitable technique may be used to distinguish between the full and empty ring buffer cases when the head pointer and the tail pointer point to the same entry. For example, a count may be maintained for the ring buffer denoting the number of allocated entries. The count may be initialized to 0, incremented each time an entry is allocated by the head pointer advancing, and decremented each time an entry is flushed and reclaimed by advancing the tail pointer.

In at least some systems, the ring buffer may be implemented using an array where, for example, the entries 1 through 9 as in FIG. 2B correspond to array indices. The circular nature of the ring buffer may be implemented using the linear array by considering the sequential array indices as if connected end to end or as a contiguous sequential array of elements. Once the head or tail pointer reaches entry 9, the head or tail pointer continues with the next entry in the sequence which is entry 1. In this manner the entries or indices of the linear array form a logical loop or ring as illustrated in the FIG. 2B.

In one existing system not using the techniques herein, both the first structure of logged data and the second structure of logged descriptors may be implemented as ring buffers. For example, the first structure may be a first ring buffer of page blocks (PBs) where each PB includes the write data of a single logged write. The second structure may be a second ring buffer of page descriptors (PDESCs) where each PDESC includes a descriptor of a single logged request such as a write operation. For a write operation that writes data, the logged write operation may be described by a PDESC of the log, the data written may be stored in a PB of the log, and the PDESC of the log may include a reference to the PB containing the data written. In some systems, requests or operations in addition to write operations may be recorded in the log using PDESCs where such PDESCs of these additional requests or operations may not have an associated PB.

In at least one embodiment, the size of each PB may generally be much larger than each PDESC. For example, in at least one embodiment, each PB may be 4K bytes or 8K bytes in size, and each PDESC may be ½ Kbyte or smaller. Thus generally, the total amount of storage used for the PBs of the log is much greater than the total amount of storage used for the PDESCs of the log.

It should be noted that the flushing of the log may be performed in response to an occurrence of any one or more defined conditions. For example, the log may be flushed in response to determining that the amount of reclaimed log space available for use and allocation is less than a specified threshold amount or size. As another example, the log may be flushed in response to determining that the amount of reclaimed PB space available for use and allocation is less than a specified threshold amount or size. As another example, the log may be flushed in response to determining that the amount of reclaimed PDESC space available for use and allocation is less than a specified threshold amount or size.

In at least one existing system, the process of flushing the log includes flushing PDESCs of the second ring buffer and associated PBs of the first ring buffer. In such an existing system, PDESC-PB pairs may be flushed, where each PDESC-PD pair denotes a logged write operation, and the PDESC of the pair points to or references the PB of the same pair. Multiple PDESC-PB pairs may be aggregated and flushed as a working set or unit. The particular PDESC-PB pairs flushed in the same working set or unit may be based on an application locality policy. For example, multiple PDESC-PB pairs included in the same working set may be flushed together where the PDESC-PB pairs of the working set write data to related logical addresses, such as LBAs of a LUN within the same logical address subrange. In some systems, multiple working sets of PDESC-PB pairs may be flushed in parallel by different flusher threads or processes. As each PDESC-PB pair is flushed from the log to the BE PDs, the log space associated with the flushed PDESC and PB may be freed and reclaimed for reuse.

However, given the ring buffer structures, each PDESC and PB flushed may not be immediately reclaimed for reuse due to the management of the ring buffers using the tail and head pointers along with the fact that the entries of the ring buffers may be flushed in an order other than FIFO with respect to their positions in the ring buffer. The different flusher threads or processes that are flushing sets of PDESC-PB pairs may complete flushing their particular sets at different points in time resulting in "holes" of unflushed entries interspersed between flushed entries. For example, with reference to the ring buffer of FIG. 2B, assume that all 9 PBs or entries of the PB ring buffer illustrated contain data waiting to be flushed where the tail pointer 154 points to element 1. The 9 PBs may be flushed in the following order (with respect to the indices of the entries) such as, for example, entry 9, entry 4, entry 6, entry 5, entry 2, entry 8, entry 7, entry 3 and entry 1. In this case, the tail pointer 154 may not advance from entry 1 until entry 1 has been flushed. However in this example, entry 1 is the last of the 9 entries to be flushed. The foregoing may result in problems such as increased write latency in that, for example, new writes are not logged until additional PB entries of the first ring buffer are reclaimed when the tail pointer 154 is advanced. The foregoing problem or constraint that occurs when the entries of the ring buffer are not flushed in a FIFO manner (e.g., flushed in an order different from the order in which the entries are allocated from the head pointer position) and not being able to advance the tail pointer from a current entry until the current entry has been flushed may also be referred to herein as the tail constraint or problem.

Described in the following paragraphs are improved techniques that may be used in connection with the log and the structures used to denote the request or operations stored in the log. The techniques provide for optimization of write latency and improved log space reclamation by avoiding the above-noted problem that may occur when flushing the log implemented using a ring buffer for PBs. Additionally, the techniques herein provide for detecting invalid PDESCs such as due to not modifying the PDESC and PB of the pair atomically or transactionally.

In at least one embodiment, the PBs may be implemented using a pool of PBs that are not organized and maintained as a ring buffer. In such an embodiment, the PBs may be organized and maintained as a pool while the PDESCs may be organized and maintained as a ring buffer. In at least one embodiment, the PDESC ring or ring buffer may be implemented as an array or linked list where each PDESC entry in the ring buffer may have an associated sequence number or identifier. Unique monotonically increasing sequence numbers or identifiers may be assigned to PDESC entries as they are used to log operations, such as write operations. The sequence numbers may denote the time dependent ordering of the logged operations or requests. A PDESC that points or references a PB may be referred to as a PDESC-PB pair where the PB of the pair contains the content stored at the logical address included in the PDESC of the pair.

In at least one embodiment in accordance with the techniques herein, a working set of PDESC-PB pairs may denote a next set of PDESC-PB pairs waiting to be flushed from the log to the BE PDs. The working set may be partitioned into buckets or groups of related PDESC-PB pairs where the PDESC-PB pairs in the same bucket are related in accordance with a policy. For example in at least one embodiment, the PDESC-PB pairs included in the same bucket may have the same metadata (MD) MID page. The MD MID page may be included in mapping information used to map a logical address to its associated BE PD location where the BE PD location is a physical storage location of content stored at the logical address. All PDESC-PB pairs in the same bucket may be sorted based on the LBAs of the PBs of the pairs. The PDESC-PB pairs in the bucket may have a defined sequence based on their respective sequence numbers associated with the PDESC entries of the PDESC ring buffer.

The PDESC-PB pairs in the bucket may be flushed in the order based on increasing sequence numbers. For each bucket, a BHFS (bucket highest flushed sequence) may be maintained and persistently stored. In at least one embodiment, the BHFS for a bucket may denote the current sequence number of the PDESC-PB pair that is currently being flushed from the bucket or the next PDESC-PB pair to be flushed from the bucket. More generally, a PBDESC-PB pair may be included in the bucket and the PDESC-PB pair may have a sequence number that is less than the BFHS of the bucket thereby indicating that the PDESC-PB pair has already been flushed from the bucket. Thus, once flushing completes for one or more PDESC-PB pairs of the bucket, the BHFS of the bucket may be accordingly updated to the next sequence number of the next PDESC-PB pair to be flushed from the bucket. In this manner, PBs may be reclaimed for reuse as PDESC-PB pairs are flushed from the different buckets. For a bucket including a PDESC-PB pair having a first sequence number, the PB of the PDESC-PB pair may be released and reclaimed for reuse once flushing of the PDESC-PB pair has completed and the BHFS for the bucket accordingly updated to another sequence number following (e.g., greater than) the first sequence number. In such an embodiment, each bucket may be flushed independently of all other buckets and PBs may be reclaimed on a per bucket basis based on the BHFSs associated with their respective buckets. In response to updating a BHFS for a bucket, the PBs of the bucket that are associated with sequence numbers of PDESC-PB pairs that are less than the BHFS included in the bucket may be reclaimed for reuse. Generally, in an embodiment where the BHFS denotes the highest sequence number of the PDESC-PB pair currently being flushed or next to be flushed from the bucket, a PB from the bucket having an associated sequence number less than the BHFS may be reclaimed and reused. Additionally, any PDESC of a bucket having an associated sequence number that is less than the BHFS of the bucket may be considered an invalid PDESC. In at least one embodiment, the buckets of the working set may be flushed in parallel by different threads or processes which may progress at varying rates in flushing the different buckets of the working set. The BHFS values of the buckets of the working set may be stored persistently, such as on the log devices, along with the regular tail and head pointers used for maintaining the PDESC ring buffer. In such an embodiment, the PDESCs may be released and available for reuse as described elsewhere herein based on the tail pointer of the PDESC ring buffer.

In at least one embodiment, the PB pool may be implemented using an array or linked list of PB entries. In one embodiment, a list of PBs may be denoted as a list of indices associated with the PBs. A bit vector may include a different bit for each PB, where the bit associated with a PB has a value of 1 when the PB is allocated and the bit associated with the PB otherwise has a value of 0 when the PB is unallocated or free. Once a PB is flushed, it may be reclaimed or released immediately by indicating that its associated index or bit in the bit vector denotes the state of unallocated or free (e.g., where the bit is set to 0). Thus, using the PB pool rather than a PB ring buffer has no dependencies, problems or constraints that may occur due to the tail pointer management of the ring buffer as noted above. With a PB pool, each PB may be released or reclaimed immediately after the data of the PB has been flushed or destaged to a BE PD.

The foregoing and other advantages and details of the improved techniques are described in more detail in the following paragraphs.

Before proceeding with further description and considerations of using a pool, such as for the PBs, rather than a ring buffer structure, following is a discussion of additional details regarding use of a metadata (MD) structure of mapping information that may be used in at least one embodiment in accordance with the techniques herein with the PB pool structure, sequence numbers or identifiers (IDs) that may be used in at least one embodiment in accordance with the techniques herein, and a request processing protocol that may be used in at least one embodiment.

The mapping information may be used to map a logical address, such as a LUN and an LBA or offset, to its corresponding storage location, such as a physical storage location on BE non-volatile PDs of the system. Consistent with discussion elsewhere herein, write requests or operations stored in the log may be flushed to the BE PDs (non-volatile) providing storage locations for the written data. For example, a logged write operation that writes first data to a logical address may be flushed whereby the logged first data is written out to a physical storage location on a BE PD. The mapping information may be used to map the logical address to the physical storage location containing the content or data stored at the logical address. In at least one embodiment, the mapping information may include a MD structure that is hierarchical structure of multiple layers.

Figure 3A:
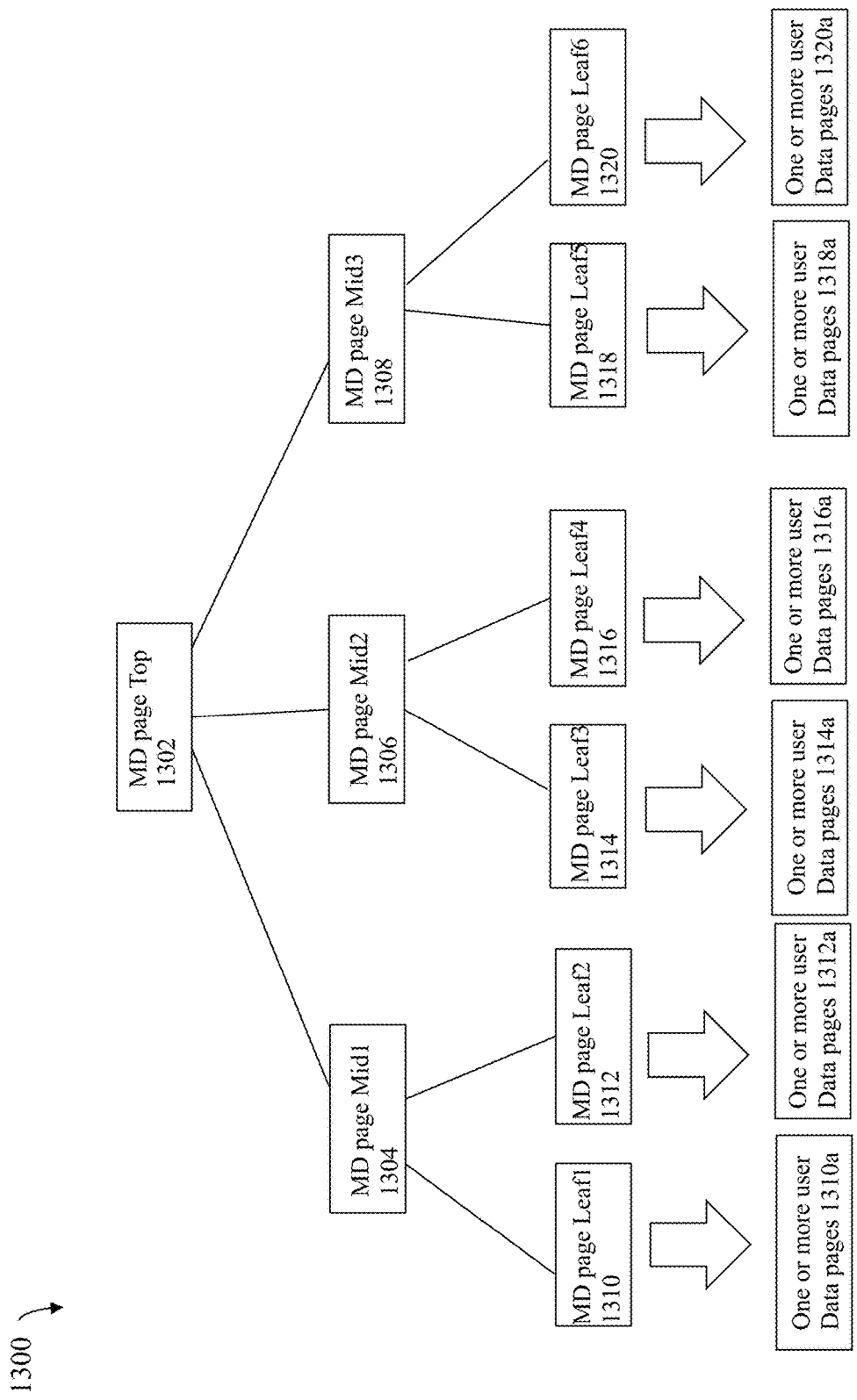
FIG. 3A is an example of mapping information in the form of a metadata structure that may be used in connection with mapping logical addresses to physical addresses or storage locations in at least one embodiment in accordance with the techniques herein.

In at least one embodiment, the mapping structure for a LUN, such as a LUN A, may be in the form of a tree having a plurality of levels. More generally, the mapping structure may be in the form of any ordered list or hierarchical structure. In at least one embodiment, the mapping structure for the LUN A may include LUN MD in the form of a tree having 3 levels including a single top or root node (TOP node), a single mid-level (MID node) and a bottom level of leaf nodes (LEAF nodes), where each of the MD page leaf nodes may point to, or reference (directly or indirectly) one or more pages of stored data, such as user data stored on the LUN A. Each node in the tree may correspond to a MD page including MD for the LUN A. More generally, the tree or other hierarchical structure of various MD pages of the mapping structure for the LUN A may include any suitable number of levels, such as more than 3 levels where there are multiple mid-levels. In at least one embodiment the tree of MD pages for the LUN may be a B+ tree, also sometimes referred to as an "N-ary" tree, where "N" indicates that each node in the tree structure may have up to a maximum of N child nodes. For example, in at least one embodiment, the tree of MD pages for the LUN may specify N=512 whereby each node in the tree structure may have up to a maximum of N child nodes. For simplicity of illustration, the tree structure of MD pages, corresponding to the mapping structure in at least one embodiment, is represented in FIG. 3A as including only 3 levels where each node in the tree may have at most 3 child nodes. Generally, the techniques herein may be used with any layered or hierarchical structure of MD pages.

Referring to FIG. 3A, shown is an example 1300 of a tree of MD pages that may be used in an embodiment in accordance with the techniques herein. The example 1300 includes a tree of MD pages denoting the mapping structure as discussed above with 3 levels—a top or root level, level 1, including a single MD TOP page; a single mid or middle level, level 2, of MD MID pages; and a bottom level, level 3, of leaf nodes of MD LEAF pages. In the example 1300, the top or root level, level 1, includes MD page 1302; the mid or middle level, level 2, includes MD pages 1304, 1306 and 1308; and the bottom level, level 3, includes MD pages 1310, 1312, 1314, 1316, 1318 and 1320, which may also be referred to as leaf nodes. As also illustrated in the example 1300, each of the leaf MD pages in level 3 of the tree points to, or references (e.g., directly or otherwise indirectly using one more additional levels of indirection of pointers not illustrated) one or more user data pages or blocks including data stored at various LBAs of a LUN such as the LUN A. For example, MD pages 1310, 1312, 1314, 1316, 1318 and 1320 point or reference, respectively, one or more UD pages 1310*a*, 1312*a*, 1314*a*, 1316*a*, 1318*a* and 1320*a*.

The links or connections between a parent node (at level M) and its one or more child nodes (at level M+1) in the tree 1300 generally represent mappings between the parent node and the one or more child nodes. In at least one embodiment, the parent node may include a reference used to access (directly or indirectly) each of its one or more child nodes. For example, the root node MD page top 1302 may include addresses or pointers used to access each of its child nodes 1304, 1306 and 1308. The mid-level node MD page mid1 1304 may include addresses or pointers used to access each of its child leaf nodes 1310, 1312. The mid-level node MD page mid1 1306 may include addresses or pointers used to access each of its child leaf nodes 1314, 1316. The mid-level node MD page mid1 1308 may include addresses or pointers used to access each of its child leaf nodes 1318, 1320.

In at least one embodiment, each of the addresses or pointers included in a MD page that references a location in another MD page or references a location in a UD page may be a physical storage location on the back-end PDs. Thus, the traversal between connected nodes of the structure 1300 may correspond to traversing physical address or storage locations included in pages or nodes that are parent nodes.

In connection with accessing a particular UD page in at least one embodiment, all MD pages in a path from the root or top level of the tree to the UD page may be required to be traversed in a consecutive serialized order in which such pages appear in the path traversal down the path from the top or root level to the UD page accessed using a particular one of the MD page leaf nodes. For example, assume UD page or block X is included in the set of UD pages 1312*a*. In order to access UD page X of 1312*a*, the following denotes the consecutive serialized order in which the MD pages forming a sequence are accessed: MD page top 1302, MD page mid1 1304, and MD page leaf2 1312. Generally, in at least one embodiment, each of the MD pages may include pointers or addresses to locations of one or more child pages or nodes. Thus, the foregoing traversal of MD pages denotes the sequence of MD pages that are processed in consecutive serialized order in order to access the particular UD page, such as UD page X. In order to access the UD page X as stored on PDs where UD page X includes first data needed to service a read I/O operation in connection with a cache miss of the first data, each of the MD pages in the foregoing sequence (e.g., MD page top 1302, MD page mid1 1304, and MD page leaf2 1312) needs to be accessed in consecutive serialized order. In at least one embodiment, the sequence of MD pages, and more generally, the path from the MD page top to the UD page X, forms a linked list of nodes of pages. In at least one embodiment, each parent node or MD page of the structure 1300 may generally include multiple pointers or references to locations of its child nodes or pages. For example, MD page top 1302 includes pointers to locations of its child nodes, MD pages 1304, 1306 and 1308. MD page mid2 1306 includes pointers to locations of its child nodes, MD pages 1314 and 1316.

The data pages 1310*a*, 1312*a*, 1314*a*, 1316*a*, 1318*a* and 1320*a* include UD stored on particular logical addresses of a LUN's address space, such as the LUN A's logical address space. In at least one embodiment each MD leaf may hold MD for a specified number of LBAs of a LUN. For example, in one embodiment each MD leaf may hold MD for 512 LBAs. For example, with reference to FIG. 3A, the data pages 1310*a*, 1312*a*, 1314*a*, 1316*a*, 1318*a* and 1320 each include user data stored on particular logical addresses of the LUN A's logical address space. It may be, for example, that element 1310*a* includes user data stored at a first set of LBAs 0-511; and that element 1312*a* includes user data stored at a second set of LBAs 512-1023. Generally, the particular LBAs of the LUN mapped to each MD page may vary with embodiment. For example, in at least one embodiment, consecutive sequential subranges of the LUN's logical address space may be mapped to the MD page leaves. Additionally, when the tree is traversed in a depth first manner, the MD page leaves may correspond to consecutive sequential subranges. For example, the element 1310*a* denotes data pages for LBAs 0-511; the element 1312*a* denotes data pages for the LBAs 512-1023; the element 1314*a* denotes data pages for LBAs 1024-1535; the element 1316*a* denotes data pages for LBAs 1536-2047, and so on.

In at least one embodiment, when the structure 1300 is traversed in a depth first manner (i.e., from the left-most path to the right most path as arranged in the tree), the MD page leaf nodes that occur in the depth first traversal correspond to consecutive sequential LBA subranges of a LUN. In at least one embodiment, when the overall tree including MD page top node 1302 and all its descendant nodes are traversed in this depth first manner, the MD page leaf nodes that occur in the depth first traversal correspond to consecutive sequential LBA subranges of a LUN.

In at least one embodiment as described herein, each of the MD pages and data blocks in the example 1300 may be of a predetermined size and each of the MD pages may hold a known number of entries containing pointer or address values. In such a case and in combination with the correspondence of sequential consecutive LBA ranges of each MD leaf page, an embodiment may perform a calculation to determine the MD page at a particular level that is accessed in the tree MD mapping structure 1300 to determine the data block for a particular LUN and LBA. Similarly, it is a straightforward mathematical calculation to determine the index, offset of entry in a particular page or node to be accessed in connection with obtaining data blocks stored at the particular LUN and LBAs of the LUN. Each MD page in 1300 may be known to include MD relevant for accessing data on a particular LUN and one or more LBAs of that LUN. For example, consistent with discussion above, element 310*a* denotes the data blocks for LBAs 0-511 of a LUN. In order to access the data block for an LBA of the LUN in the LBA subrange 0-511, MD pages 1302, 1304 and 1310 may be traversed in sequential order. In particular, the first entry or offset of the MD page top 1302 may contain the address of the MD page mid 1 1304; the first entry or offset of the MD page mid 1 1304 may contain the address of the MD page leaf 1 1310; and the first entry or offset of the MD page leaf 1 1310 may contain the address of the data blocks for 1310*a*.

In a similar manner, a mapping may be made regarding what MD pages of the structure 300 and entries thereof are used in connection with obtaining data blocks containing data for any particular LUN and LBA. In at least one embodiment, the particular MD pages used to access a data block including data for a particular LUN and LBA may be known based on such mappings and correspondence of LBA subranges to particular MD leaf pages.

In an embodiment in accordance with the techniques herein for purposes of data integrity and correctness, the time order dependency of the logged data and operations of the log needs to be maintained. The time order is with respect to the relative order in which the operations are to be applied to the stored data of the data storage system to ensure data integrity and correctness. In an active-active system where I/Os may be serviced by both nodes of the dual node system, the time order dependency requirement needs to be maintained and synchronized across both nodes of the system. For example, at a first point in time, the node A may process a first write that is acknowledged to the host as completed. The first write may write first data to a first logical address, where the first data is stored in the log and subsequently flushed to the BE PDs. At a second point in time subsequent to the first point in time, the node B may process a second write that is acknowledged to the host as completed. The second write may write second data to the first logical address where the second data is also stored in the log and subsequently flushed to the BE PDs. When flushing the logged first data and the logged second data, the time order dependency or requirement is that the second data of the second write needs to be stored to the physical storage containing the data for the first logical address after the first data in order to ensure that the actual physical storage contains the correct data expected by the host based on the order in which the first and second writes were acknowledged to the host as being applied to the first logical address. Since the second write is acknowledged as successfully complete subsequent to the successful acknowledgement of the first write, the host expects the first logical address to contain the second data written (or overwritten) by the second subsequent write. In at least one system, the time order of logged data and operations may be denoted using global sequence numbers or IDs. Any optimizations performed such as, for example, in connection with parallel flushing must maintain the same resulting data content as described by the time order dependency denoting the logical ordering in which the logged requests or operations are applied.

In one such dual node system in accordance with the techniques herein, one of the two nodes may be designated as the primary node which assigns each logged operation a new unique sequence ID. The sequence ID of the logged requests or operations denote the time dependent order in which such logged requests or operations are logically applied to the stored data on the BE PDs in order to maintain the data integrity and data content and expected by the host or other clients. The order in which the data is flushed from the log to the BE PDs maintains the time order requirement or dependency as denoted by the sequence IDs.

Thus, the designated primary node of the system node pair is designated as the primary node with respect to all write operations and other operations included in the log across all the LUNs configured from storage of the BE PDs accessible by the node pair. The primary node, for example, assigns a unique sequence ID to each write I/O operation having its write data stored in the log. The primary node assigns all the sequence IDs independent of which node receives the write I/O or other operation having corresponding logged data that is subsequently flushed from the log. Thus, the primary node assigns sequence IDs for writes and other commands or operations that are logged, where such writes and other commands are received collectively by both the primary node and the non-primary node of the pair. The sequence IDs assigned establish the time order. In particular, the time order may be denoted by the monotonically increasing sequence IDs assigned to logged request or operation. To illustrate, assume a first sequence ID is assigned to a first write I/O that writes first data, a second sequence ID is assigned to a second write I/O that writes second data, and the first sequence ID is less than the second sequence ID. In this case, the first write I/O and first data occur in the time order sequence prior to the second write I/O and second data, where the first write I/O and the first data are written or applied prior to the second write I/O and the second data. In this manner, the sequence IDs assigned by the primary node are used to establish the time order dependency of all the write I/Os written to all the LUNs configured from storage of the BE PDs where the pair of nodes services all I/Os directed to such LUNs.

In one dual node system, the log may include page blocks or PBs and page descriptors or PDESCs as mentioned above. Each write I/O that writes data to a target logical address may have its associated write data stored in the log using a PB and a PDESC. The write data is stored in a PB and the PDESC references or points to the PB containing the write data. The PDESC may generally include other information regarding the write I/O such as, for example, the target logical address (e.g., LUN and LBA or offset), the sequence ID, a pointer (ptr) or reference to the PD including the write data associated with the PDESC, and other information such as flags associated with the logged operation or request.

In one such dual node system, the designated primary node that assigns sequence IDs may also be the sole node managing the page descriptors or PDESCs stored in the log. Thus the primary node is the sole node of the pair that assigns sequence IDs of logged requests or operations received by both nodes. The primary node may also be the sole node that handles allocating PDESCs and freeing PDESCs on behalf of requests or operations received by both nodes. Thus, in an active-active configuration where both nodes of the pair may receive I/Os and other commands, all requests for new sequence IDs and new PDESC allocations of the log are done only by the primary node even though the received I/Os or other commands may be received by the peer non-primary node. The primary node may assign monotonically increasing sequence IDs to new requests. In such a system, each node receiving the I/O or other command requiring caching obtains an available PB from the log.

In at least one such system, the node A may have its own separate PB partition or tier of PBs managed solely by the node A, where the node A may allocate and free PBs from its own PB tier. However, peer node B may have read access to the data stored in the PBs of node A's PB tier. In such a system, the node B may have its own separate PB tier or partition of PBs managed solely by the node B, where the node B may allocate and free PBs from its own PB tier. However, peer node A may have read access to the data stored in the PBs of node B's PB tier.

Figure 3B:
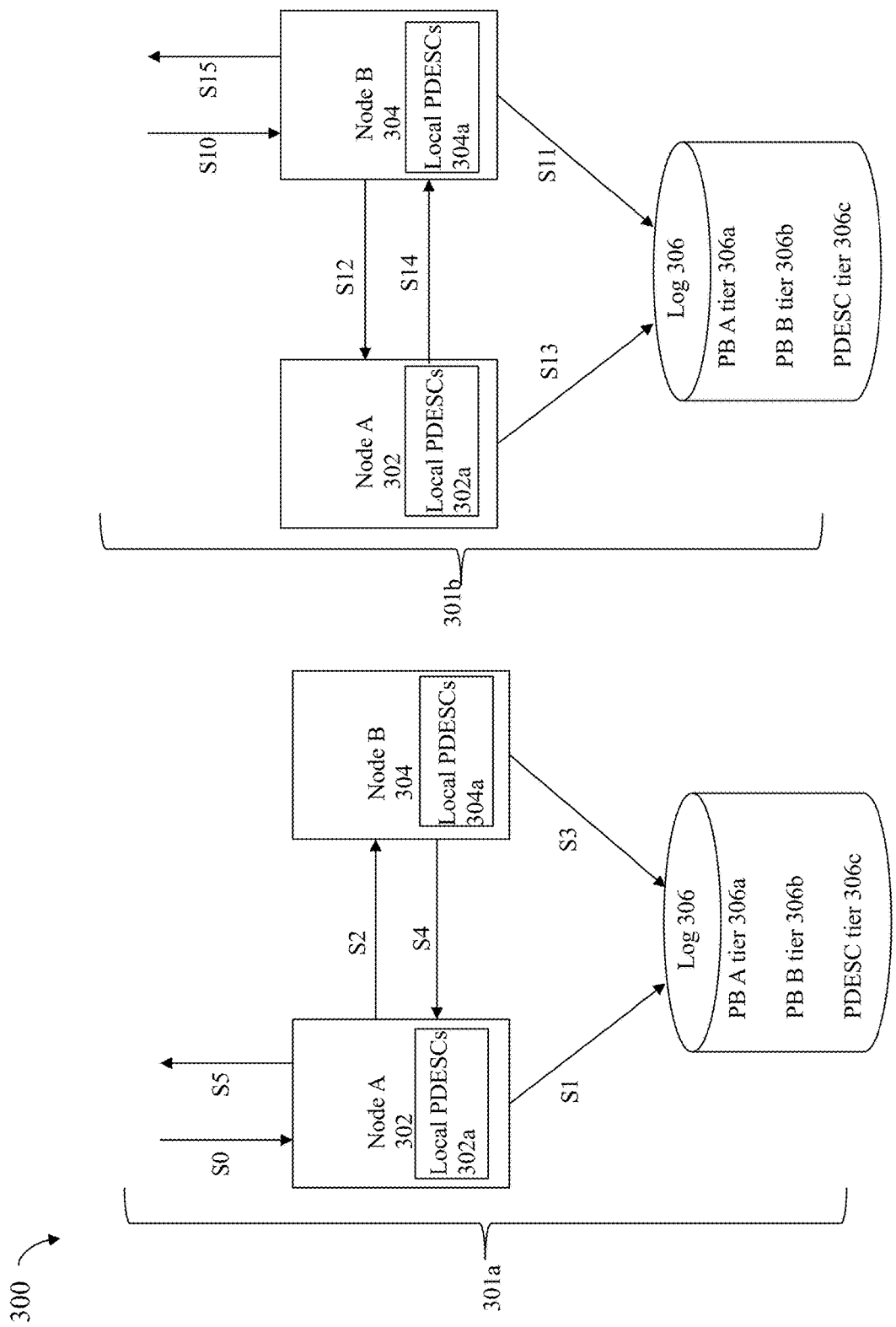
FIG. 3B is an example illustrating processing performed for a protocol in a data storage system in an embodiment in accordance with the techniques herein.

Referring to FIG. 3B, shown is an example 300 illustrating a protocol that may be used in a system in accordance with the techniques herein to process received requests. The example 300 illustrates the dual node architecture including a node A 302, a node B, and a cache 306. For purposes of illustration in discussion below related to FIG. 3B, assume the primary node is node A.

The example 300 includes an element 301a denoting the sequence of steps performed in at least one system to process the write I/O operation received by the primary node which for purposes of illustration is the node A. The example 300 includes an element 301b denoting the sequence of steps performed in at least one system to process the write I/O operation received by the non-primary node which for purposes of illustration is the node B.

Referring to the element 301a, at a step S0, the node A 302 receives the write I/O from a host. Following the step S0, a step S1 is performed in which the node A 302 allocates a PB for the write I/O in the log 306, and stores the write data of the received write I/O in the PB of the log 306. The log 306 includes a PB A tier 306a, a PB B tier 306b, and a PDESC tier 306c. The PB A tier 306a denotes the PBs managed exclusively by the node A. In the step S1, the node A allocates the PB for the write I/O from the PB A tier 306a. The PB B tier 306b denotes the PBs managed exclusively by the node B. The PDESC tier 306c denotes the PDESCs managed by the primary node, which in this example is node A. Following the step S1 is a step S2.

In the step S2, the node A 302, as the primary node, allocates a PDESC from the PDESC tier 306c of the log 306, assigns a new sequence ID to the PDESC, and creates a local in-memory copy (302a) of the descriptor information to be stored in the PDESC. The descriptor information includes the new sequence ID, the target logical address and a pointer or reference to the allocated PB. The local in-memory copy 302a may be a node-local copy of the PDESCs in the node A's local memory (e.g., RAM or other form of volatile memory) accessible only to the node A 302. In the step S2, the node A 302 sends the descriptor information and the address of the PDESC in PDESC tier 306 of the log 306 to the peer node B 304. Following the step S2 is a step S3.

In the step S3, the peer node B 304 receives the descriptor information and the address of the PDESC in the log 306 and persistently stores the descriptor information in the PDESC located at the address in the log 306. In the step S3, the peer node B 304 also stores a node-local copy of the PDESCs 304a in its local memory (e.g., RAM or other form of volatile memory) accessible only to node B 304. Following the step S3 is a step S4.

In the step S4, the peer node B 304 sends a response to the receiving node A 302 indicating that the PDESC is stored persistently in the log 306. The node A 302 receives the response from the node B 304. Following the step S4 is a step S5. In the step S5, the node A 302 sends a response to the host regarding successful completion of the write I/O operation received in the step S0.

In the element 301a the primary node A 302 receives the write I/O operation. However in a dual node architecture, both the node A 302 and its peer node B may receive write I/Os as well as other commands and operations. Reference is now made to the element 301b illustrating the sequence of processing steps performed in at least one system to process the write I/O operation received by the non-primary node, which for purposes of illustration in this example is the node B.

At a step S10, the non-primary node B receives a write I/O from a host. Following the step S10, a step S11 is performed in which the node B 304 allocates a PB for the write I/O in the log 306, and stores the write data of the received write I/O in the PB of the log 306. In the step S11, the node B allocates the PB from the PB B tier 306b. Following the step S11 is a step S12.

In the step S12, the node B 304 issues a request to the primary node A to allocate a PDESC from the PDESC tier 306c of the log 306 and to also assign a new sequence ID to the allocated PDESC. In the step S12, the node B 304 receives the address of the PDESC in the PDESC tier 306c and receives the new sequence ID. The node B 304 creates a local copy 304a of the descriptor information to be stored in the PDESC. The descriptor information includes the new sequence ID, the target logical address, and a pointer or reference to the allocated PB. The local copy 304a of the descriptor information or PDESC may be a node-local copy of the PDESCs in the node B's local memory (e.g., RAM or other form of volatile memory) accessible only to the node B 304. In the step S12, the node B 304 sends the descriptor information and the cache address of the PDESC to the peer node A 302. Following the step S12 is a step S13.

In the step S13, the peer node A 302 receives the descriptor information and the address of the PDESC in the log 306. The peer node A 302 may then persistently store the descriptor information in the PDESC located at the address in the log 306. In the step S13, the peer node A 302 also stores a node-local copy (302a) of the PDESC in its local memory (e.g., RAM or other form of volatile memory) accessible only to node A 302. Following the step S13 is a step S14.

In the step S14, the node A 302 sends a response to the node B 304 indicating that the PDESC is stored persistently in the log 306. The node B 304 receives the response from the node A 302. Following the step S14 is a step S15. In the step S15, the node B 304 sends a response to the host regarding successful completion of the write I/O operation received in the step S10.

It should be noted that the processing of FIG. 3B is performed with respect to a write operation where a PDESC-PB pair is logged for the write operation. In some embodiments, other operations or requests may be similarly processed and logged as described in connection with the processing of FIG. 3B. In at least one embodiment, some of the other operations or requests may only result in logging a PDESC without an associated PB. For example, an operation, command or request to create a snapshot may be logged using a PDESC assigned a sequence ID but where the PDESC is not associated with an allocated PB.

As noted above, in at least one existing system not in accordance with the techniques herein, the PB tiers 306a-b and the PDESC tier 306c may be implemented using ring buffers. As also noted above, an embodiment in accordance with the techniques herein may alternatively implement at least the PB tiers 306a-b as PB pools rather than as ring buffers. In at least one embodiment, each of the PB tiers 306a-b may be implemented as a separate PB pool. In at least one embodiment each PB pool, such as the PB tier 306a, may be an array or linked list of PB entries. In one embodiment, a list of PBs may be denoted as a list of indices associated with the PBs. A bit vector may include a different bit for each PB, where the bit associated with a PB has a value of 1 when the PB is allocated and the bit associated with the PB otherwise has a value of 0 when the PB is unallocated or free. Once a PB is flushed, it may be reclaimed or released immediately by indicating that its associated index or bit in the bit vector denotes the state of unallocated or free (e.g., where the bit is set to 0). Thus, using the PB pool rather than a PB ring buffer has no dependencies, problems or constraints that may occur due to the tail pointer management of the ring buffer as noted above. With a PB pool, each PB may be released or reclaimed immediately after the data of the PB has been flushed or destaged to a BE PD.

In one embodiment in accordance with the techniques herein, each of the PB tiers 306a-b may be implemented as a separate PB pool such as an array of PBs. In such an embodiment, the PDESC tier may be implemented as a ring buffer as discussed generally in connection with FIG. 2B. In such an embodiment, the PDESC ring buffer may experience the tail pointer management problems and drawbacks as discussed in connection with FIG. 2B.

Replacing a PB ring buffer with a PB pool may result in another problem requiring further consideration. Another problem that may occur is data corruption due to a PDESC-PB inconsistency or invalid PDESC when, for a PDESC-PB pair (where the PDESC of the pair points to the PB of the pair), the PDESC and the PB of the same pair are not updated atomically or transactionally such as when logging a new write operation in a PDESC-PB pair or when flushing the PDESC-PB pair from the log to the BE PDs. Consider the following scenario using a ring buffer for PDESCs of the log and using a pool for PBs of the log. In a step S11, there is a write I/O that writes D1 to LBA1 of a LUN. Following the step S11 is a step S12 where the write may be logged by storing the write data D1 in a PB1, and also storing a PDESC1 for the write I/O in the log where the PDESC1 points to PB1. Some time later following the step S12, a step S13 is performed where the PDESC1-PB1 pair is flushed.

Following the step S13 is a step S14. In the step S14, the PB1 may be immediately reclaimed for reuse while PDESC1 is not immediately available for reclamation and reuse due to the tail constraint as described above (e.g., in connection with FIG. 2B). Following the step S14 is a step S15. In the step S15, a second write that write D3 to LBA 3 of the LUN is received. Following the step S15 is a step S16 where the second write is logged. In the step S16, the second write is logged by storing the write data D2 in the PB1. Following the step S16, the system may crash before storing a PDESC2 for the second write I/O in the log where the PDESC2 points to PB1. Thus, on recovery, the system now has PB1 including the data for LBA 3 and also has the PDESC1 (for LBA 1) pointing to PB1 (which includes the data for LBA 3). As a result, a data corruption has occurred with respect to the log since the PDESC1 for LBA 1 is determined as valid and points to PB1, but PB1 actually contains the data D3 for LBA 3.

Generally a crash, or system crash, occurs when a system fails such as due to a software and/or hardware failure. For example, a system may crash if the operating system stops functioning properly and aborts processing, if the system processors experience a hardware failure, and the like.

To avoid the above-noted potential data corruption and PDESC-PB inconsistency or invalid PDESC due to not atomically updating the PDESC and PB of same the pair, different solutions may be considered. As a possible first solution processing may be performed to explicitly invalidate the PDESC of the pair before freeing the PB of the pair. Thus, for example, the PDESC of the pair may be invalidated before the PB of the pair is flushed by, for example, overwriting or reinitializing the PDESC of the pair so that it does not reference the PB. This first solution generally solves the PDESC-PB inconsistency and avoids invalid PDESCs. However the first solution may be characterized as expensive utilizing additional system resources since it requires an additional write to the log for each PDESC.

As another possible second solution, for a PDESC-PB pair, a strong hash of the data content in the PB may be stored in the PDESC. In this manner, during recovery after a crash, processing may be performed to recognize inconsistent PDESC-PB pairs or invalid PDESCs by detecting that the data hash in the PDESC does not match the hash of the PB pointed to by the PDESC. This second solution generally solves the PDESC-PB inconsistency by detecting the inconsistent PDESC-PB pairs and invalid PDESCs. However, the second solution may also be characterized as expensive in that an additional hash calculation is required in the I/O or data path when logging the write operation (e.g., when creating and storing the PDESC for the write operation in the log).

Thus, although both of the foregoing possible solutions solve the PDESC-PB consistency or invalidation problem when using a PDESC ring and a PB pool, both possible solutions are expensive in terms of time and system resources and may adversely impact the overall system performance.

What will now be described are embodiments in accordance with the techniques herein which detect the PDESC-PB inconsistency or invalid PDESC such as described above, and which are more efficient and less expensive in terms of time and system resources than the foregoing possible two solutions noted above.

In at least one embodiment, the PDESCs may be included in a PDESC ring buffer and the PBs may be included in one or more PB pools. As noted above, the PB pool may be implemented as an array or linked list of PB entries having an associated bit vector with a corresponding bit vector entry for each PB of the pool. As noted above, whether a PB is allocated or otherwise free and available for reuse may be denoted by a value of the bit vector entry associated with the PB. For example, a value of 0 may denote that the associated PB is free and available for reuse, and a value of 1 may denote that the associated PB is allocated. In such a structure, a PB that is freed may be reclaimed and made available for reuse once the bit vector entry corresponding to the PB is set to 0. In such an embodiment, the PDESC ring buffer may generally be as described in connection with FIG. 2B. The head pointer may denote the next PDESC entry to be allocated and, once allocated, the head pointer may be advanced to the next entry. The tail pointer may be advanced in a circular sequential manner through entries of the PDESC ring buffer as the PDESC entries are flushed. The tail pointer is not advanced from a current PDESC entry until the current PDESC entry has been flushed. In a PDESC ring buffer with allocated PDESC entries, the PDESC entries of the ring buffer from the head pointer to the entry immediately prior to the tail pointer are free and available for allocation. The PDESC ring buffer is subject to the tail constraint or problem with holes of flushed PDESCs interspersed among unflushed PDESCs as noted above in connection with FIG. 2B discussion since, in this embodiment, the PDESCs may not be flushed in the same order in which the PDESCs are allocated from the PDESC ring buffer.

Figure 4:
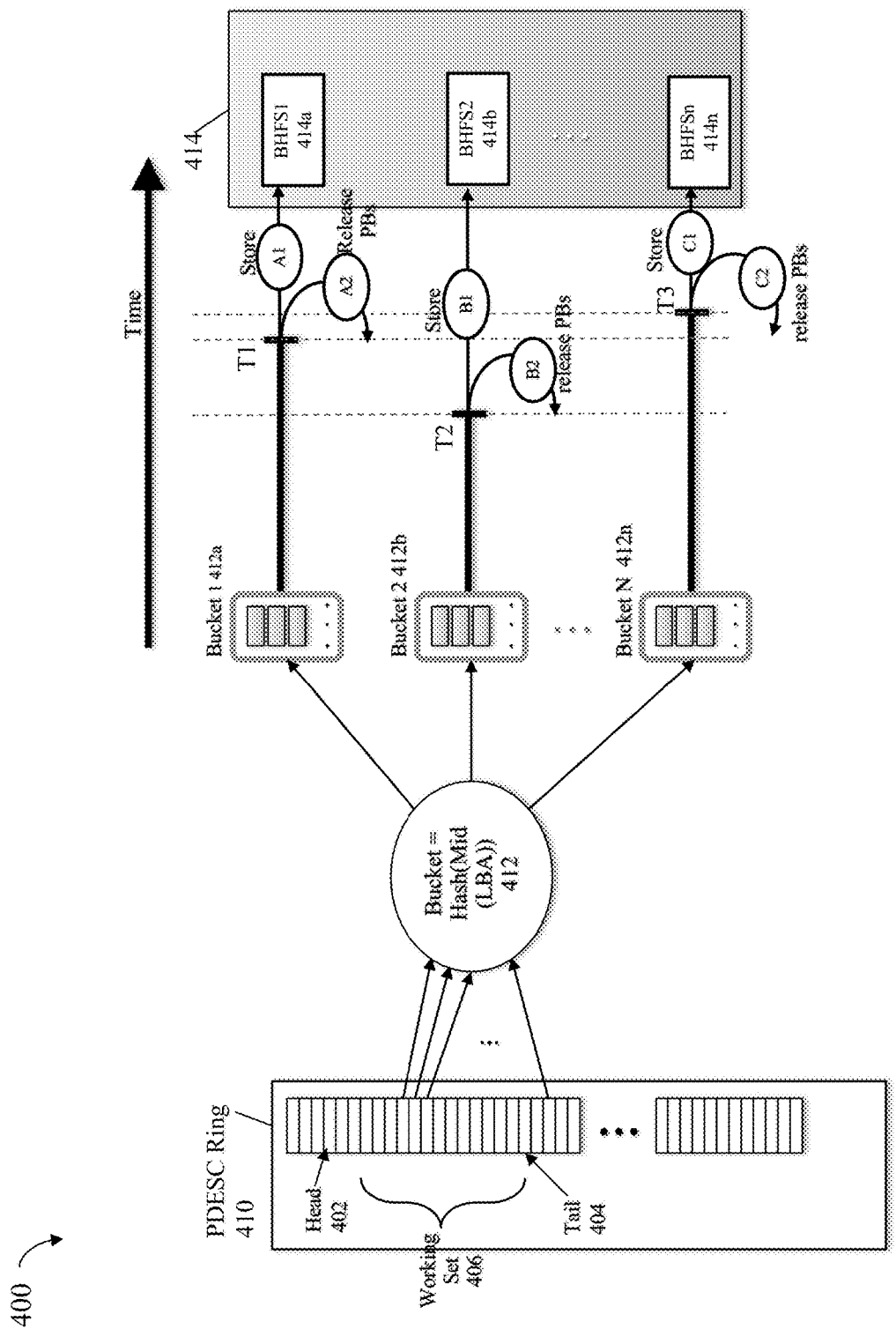
FIG. 4 is an example illustrating structures that may be used in an embodiment in accordance with the techniques herein.

Referring to FIG. 4, shown is an example 400 illustrating use of the techniques herein in at least one embodiment. The example 400 includes the PD ring 410 with its head pointer 402, tail pointer 404 and working set 406.

The head pointer 402 and the tail pointer 404 may be used in maintaining the PD ring 410 in a manner as discussed elsewhere herein such as in connection with FIG. 2B. In particular, the head pointer 402 may point to the next free or available PDESC entry to be allocated. The tail pointer 404 may point to the PDESC entry currently being flushed or the next entry to be flushed. Thus, entries from the head pointer 402 and immediately prior to the tail pointer 404 may be characterized as free, reclaimed, and available for reuse and allocation. The set of entries from the tail pointer 404 and prior to the head pointer 402 may include holes of flushed PDESCs interspersed between unflushed PDESCs since PDESCs may be flushed in a different order from which they are allocated from the PD ring 410.

The working set 406 (sometimes referred to as a flush working set) may be specified. The working set 406 may include a number of consecutive entries of the PDESC ring buffer (sometimes referred to as the PDESC ring). In at least one embodiment, the working set entries may be characterized as consecutive in the PDESC ring with respect to the order in which the PDESC entries are allocated for use from the PDESC ring. Additionally, included in the working set may be the PBs pointed to or referenced by the PDESCs of the working set. Thus, in one aspect the working set 406 may be characterized as including PDESC-PB pairs where a PDESC of a pair points to or references a PB of the pair. Consistent with other discussion herein, each PDESC-PB pair may describe a logged write operation, where the PDESC includes a sequence ID, a logical address written to by the logged write operation, and a pointer or reference to the PB containing the content or data written by the logged write operation. In connection with discussion herein, for a PDESC-PB pair included in the working set, the PDESC-PB pair may be characterized as associated with a sequence ID included in the PDESC of the pair. In a similar manner, the PB of the pair may also be characterized as associated with the sequence ID included in the PDESC of the pair.

The working set 406 may be partitioned into a number of buckets denoted as buckets 412a-n. Generally, the number of buckets N may be any suitable number of buckets. For example, in at least one embodiment, the number of buckets may be 200 or some other predefined number of buckets. Generally, a bucket B may be determined for each PDESC-PB pair of the working set 406, where B denotes a bucket number from 1 through N in this example. In the context of discussion herein, for a bucket including a PDESC-PB pair, the PDESC of the pair and also the PB of the pair may be characterized as included in or associated with the bucket.

In at least one embodiment, a function may be used to map a logical address included in the PDESC of each PDESC-PB pair to a bucket B. In at least one embodiment, the function may map the LBA of the logical address of the PDESC to the bucket B. The function may generally be any deterministic predictable mathematical function based on a relationship between the LBA and a bucket. Generally, a PDESC-PB pair may be mapped to a bucket by a single-valued function determined from the LBA of the PB of the pair. A single-valued function is function that, for each point in the domain, has a unique value in the range. For example, the function may be f(x)=y where f is function, x is the input or domain such as the LBA or some number of bits of the LBA, and y is the value in the range whereby y denotes the bucket number.

In at least one embodiment, the function used to map the LBA of a PDESC-PB pair may be a hash function, hash, that maps PDESC-PB pairs having the same MID MD page in the same bucket. The hash function may map the PDESC-pairs of one or more MID MD pages to the same bucket. The MID MD page is discussed above and illustrated in FIG. 3A. For example, the elements 1304, 1306 and 1308 denote MID MD pages in FIG. 3A. The user data pages 1310a, 1312a have the same MD page mid1 1304; the user data pages 1314a, 1316a have the same MD page mid 2 1306; and the user data pages 1318a, 1320a have the same MD page mid 3 1308. The user data pages 1310a, 1312a, 1314a, 1316a, 1318a and 1320a may correspond to BE PD locations storing user data of write operations. The hash function may, for example, map the user data pages denoted by 1310a and 1312a to the same bucket since the UD pages denoted by 1310a, 1312a have the same MD page mid 1 1304. The hash function may, for example, map the user data pages denoted by 1314a and 1316a to the same bucket since the UD pages denoted by 1314a, 1316a have the same MD page mid 2 1306. The hash function may, for example, map the user data pages denoted by 1318a and 1320a to the same bucket since the UD pages denoted by 1318a, 1320a have the same MD page mid 3 1308.

More formally, the hash function, hash, may perform a mathematical mapping of the LBA to the bucket for the PDESC-PB pair in accordance with the MID MD page associated with the LBA of the logical address in the PDESC. The hash function, hash, may calculate the bucket number B, where B=hash (MID (LBA)) 412, MID denotes the MID MD page, and LBA denotes the LBA of the logical address of the PDESC of the PDESC-PB pair. In at least one embodiment, the hash function may use a predetermined number of bits from the LBA. For example, for multiple LBAs associated with the same MID MD page, a number of bits of each LBA that are different from one another may be used as an input to hash function. The high order bits that are the same for the LBAs associated with the same MID MD page may be masked out and not used when computing the hash value (HV) by the hash function, whereby HV denotes the bucket number.

For each of the N buckets 412*a-n*, a BHFS value may be maintained and persistently stored, for example, such as at a predefined location in the NVRAM devices or log devices 414. The elements 414*a-n* denote the current values for the BFHSs respectively of the buckets 412*a-n*. The PDESC-PB pairs in a bucket may be flushed in an order that maintains the time dependent ordering denoted by the increasing sequence IDs of the PDESC-PB pairs. In at least one embodiment, the BHFS for a bucket may denote the current sequence ID of the PDESC-PB pair that is currently being flushed from the bucket. More generally, a PBDESC-PB pair having a sequence ID that is less than the BFHS of the bucket indicates that the PDESC-PB pair has already been flushed. A PDESC-PB pair of the bucket having a sequence ID that is equal to or greater than the bucket's BHFS indicates that the PDESC-PB pair has not yet been flushed from the bucket.

Thus, once flushing completes for one or more PDESC-PB pairs of the bucket, the BHFS of the bucket may be accordingly updated to the next sequence number of the next PDESC-PB pair to be flushed from the bucket. For example, assume that J is an integer and denotes the highest sequence ID of any PDESC-PB pair of the bucket that has been flushed up to a particular point in time. In this case, the BHFS of the bucket may be updated to a value greater than J, such as J+1, thereby denoting that PDESC-PB pairs of the bucket with sequence IDs less than J+1 have been flushed from the bucket.

To further illustrate, assume that the bucket 1 412*a* includes 20 PDESC-PB pairs respectively having the sequence IDs 1 through 20. At a first point in time P1, processing may be performed to flush the first 10 PDESC-PB pairs from the bucket 412*a* where the first 10 PDESC-PB pairs have the sequence IDs 1-10. Subsequently at a time P2, the BHFS1 414*a* for bucket 1 412*a* may be updated to 11 to denote that PDESC-PB pairs of the bucket 1 412*a* having associated sequence IDs less than 11 have been flushed. After the BHFS 414*a* is updated to 11, the PBs of the first 10 PDESC-PB pairs respectively having the sequence IDs 1-10 may be marked as available or free and reclaimed for reuse. Thus, at a time P3 subsequent to P2, one or more of the PBs associated with the first 10 PDESC-PB pairs flushed at the time P1 may be reclaimed and reallocated. At a time P4 subsequent to P3, another 5 of the PDESC-PB pairs in the bucket 412*a* having the sequence IDs 11-15 may be flushed. At the time P5 subsequent to P4, the BFHS1 414*a* may be updated to 16 to denote that PDESC-PB pairs having associated sequence IDs less than 16 have been flushed from the bucket 1 412*a*. After the BHFS 414*a* is updated to from 11 to 16, the PBs of the 5 PDESC-PB pairs respectively having the sequence IDs 11-15 may be marked as available or free and reclaimed for reuse.

In this manner, PBs may be reclaimed for reuse as PDESC-PB pairs are flushed from the different buckets. For a bucket including a PDESC-PB pair having a first sequence number, the PB of the PDESC-PB pair may be released and reclaimed for reuse once flushing of the PDESC-PB pair has completed and the BHFS for the bucket accordingly updated to another sequence number following (e.g., greater than) the first sequence number. In such an embodiment, each bucket may be flushed independently of all other buckets and PBs may be reclaimed on a per bucket basis based on the BHFSs associated with their respective buckets. In response to updating a BHFS for a bucket, the PBs of the bucket that are associated with sequence numbers of PDESC-PB pairs that are less than the BHFS included in the bucket may be reclaimed for reuse. Generally, in an embodiment where the BHFS denotes the highest sequence number of the PDESC-PB pair currently being flushed from the bucket, PBs from the bucket having an associated sequence number less than the BHFS may be reclaimed and reused. Additionally, any PDESC of a bucket having an associated sequence number that is less than the BHFS of the bucket may be considered an invalid PDESC. In at least one embodiment, the buckets of the working set may be flushed in parallel by different threads or processes which may progress at varying rates in flushing the different buckets of the working set. The BHFS values of the buckets of the working set may be stored persistently, such as on the log devices 414, along with the regular tail and head pointers used for maintaining the PDESC ring buffer. In such an embodiment, the PDESCs may be released and available for reuse as described elsewhere herein based on the tail pointer 404 of the PDESC ring buffer 410.

To further illustrate, reference is made to FIG. 4, which illustrates that at a time T1, all the PDESC-PB pairs of the bucket 1 412*a* may be flushed and the BHFS1 414*a* may be updated and stored persistently (A1) on the NVRAM devices 414. The BHFS1 414*a* may be updated to a value that is 1 greater than the largest sequence number of the PDESC-PB pairs of the bucket 412*a* that were flushed. Additionally, once the BHFS1 414*a* is updated as denoted by A1, the PBs of the flushed PDESC-PB pairs of the bucket 412*a* may be released or reclaimed (A2) and available for reuse.

At a time T2, all the PDESC-PB pairs of the bucket 2 411*b* may be flushed and the BHFS2 414*b* may be updated and stored persistently (B1) on the NVRAM devices 414. The BHFS2 414*b* may be updated to a value that is 1 greater than the largest sequence number of the PDESC-PB pairs of the bucket 412*b* that were flushed. Additionally, once the BHFS2 414*b* is updated as denoted by B1, the PBs of the flushed PDESC-PB pairs of the bucket 412*b* may be released or reclaimed (B2) and available for reuse.

At a time T3, all the PDESC-PB pairs of the bucket N 414*n* may be flushed and the BHFSn 414*n* may be updated and stored persistently (C1) on the NVRAM devices 414. The BHFS2 414*b* may be updated to a value that is 1 greater than the largest sequence number of the PDESC-PB pairs of the bucket 412*n* that were flushed. Additionally, once the BHFSn 414*n* is updated as denoted by C1, the PBs of the flushed PDESC-PB pairs of the bucket 412*n* may be released or reclaimed (C2) and available for reuse.

As illustrated in FIG. 4, the buckets 412*a-c* may be independently flushed, respectively, at 3 different times T1, T2 and T3. Use of the techniques herein as described above provides for reclaiming PBs of the buckets 412*a*, 412*b* and 412*n* at various points in time after the respective BFHS values 414*a*, 414*b* and 414*n* have been updated. In one aspect, the BHFS values 414a-n may be characterized as bucket tails that are analogous to a tail pointer used in connection with a ring buffer. However, the BHFS values denoting the bucket tails are limited in scope to their respective associated buckets.

An embodiment in accordance with the techniques herein as described in connection with FIG. 4 may reclaim PB space at the bucket level of granularity based on the BHFS values of the buckets. Generally, for a PDESC-PB pair with an associated sequence number that is less than a BHFS of a bucket including the pair, the PB of the pair may be reclaimed for reuse. The foregoing PB may be reclaimed for reuse even though the PDESC of the pair may not yet have been reclaimed for reuse due to the PDESC ring buffer tail constraint.

The potential data corruption and PDESC-PB inconsistency or invalid PDESC problem described above that may occur as a result of a system crash may be subsequently detected in recovery processing in an embodiment in accordance with the techniques herein. In particular, consider a scenario where the system crashes and then performs recovery processing. More generally, recovery processing may be triggered by an event such as a system crash or failure. As part of recovery processing in an embodiment in accordance with the techniques herein, the PDESCs stored in the PDESC ring buffer 410 of the log may be processed. For each PDESC in the PDESC ring buffer 410, the bucket for the PDESC may be calculated based on the hash function used to determine the bucket number for the PDESC. In at least one embodiment, the PB referenced or pointed to by the PDESC may be determined, and the LBA of the PB may be obtained. As discussed elsewhere herein, the hash function may map the LBA of the PB referenced by the PDESC to the bucket number for the PDESC. For example, the hash function may perform a mathematical mapping of the LBA to the bucket for the PDESC in accordance with the MID MD page associated with the LBA. More formally, the hash function, hash, may calculate the bucket B as B=hash (MID (LBA)). In any case, the hash function, hash, used during recovery processing for the PDESC to determine the bucket for the PDESC is the same hash function used previously during runtime prior to the crash to map a PDESC (or more specifically a PDESC-PB pair) to a particular bucket B.

Continuing with recovery processing, the BHFS for the bucket B calculated using the hash function may be retrieved from its persistently stored location. In at least one embodiment, the BHFS values for all the buckets may be persistently stored to a predefined persistent storage location such as a predefined location on the NVRAM drives 414 upon which the log is stored. The sequence ID of the PDESC may be compared to the BHFS of the bucket B. If the sequence ID of the PDESC is less than the BHFS of the bucket B, then the PDESC is considered invalid; and otherwise, the PDESC may be considered valid. Consistent with other discussion herein, if the sequence ID of the PDESC is less than the BHFS of the bucket B, it means that the PDESC was flushed prior to the system crash but the PDESC was not yet reclaimed due to the tail constraint of the PDESC ring. However, the PB pointed to or referenced by the PDESC has been reclaimed and the PB may have been reallocated and reused for storing other new data associated with a different PDESC. A PDESC determined as invalid by recovery processing may be ignored or discarded and not further flushed in connection with subsequently flushing the log. A PDESC determined as valid by recovery processing may be flushed in connection with subsequently flushing the log.

Thus, an embodiment in accordance with the techniques herein provides for efficiently reclaiming PBs related to the working set of specific buckets as data from such PBs is flushed. Additionally, the techniques herein provide for detecting inconsistent PDESC-PB pairs and invalid PDESCs thereby avoiding any data integrity and corruption associated with such inconsistencies and invalid PDESCs.

Generally, an embodiment may flush any number of PDESC-PB entries from a bucket at a point in time before updating the BHFS associated with the bucket. The particular PDESC-PB pairs that may be flushed in parallel, in the same bucket or across different buckets, may vary with embodiment. Processing may be performed to determine which particular PDESC-PB pairs may be flushed in parallel in accordance with sequence IDs of the PDESC-PB pairs. In at least one embodiment, PDESC-PB pairs of the same bucket may be flushed in parallel. In at least one embodiment, two or more buckets may be flushed in parallel. In at least one embodiment, the PDESC-PB pairs of the same bucket may be flushed sequentially based on the increasing sequence ID of the PDESC-PB pairs. In any case, the order in which PDESC-PB pairs are flushed and the particular PDESC-PB pairs flushed in parallel needs to maintain the logical time order dependency denoted by the increasing sequence IDs of the PDESC-PB pairs. For example, consider 10 PDESC-PB pairs respectively assigned the sequence IDs 1-10. Assume that the 10 PDESC-PB pairs are recorded for 10 write I/Os that write to 10 different LBAs in a specified LBA range within a first time period. In at least one embodiment, the 10 PDESC-PB pairs may be flushed serially. In another embodiment any number of the 10 PDESC-PB pairs may be flushed in parallel since none of the 10 PDESC-PB pairs write to the same LBA and also there are no conflicting pending logged writes (e.g., other PDESC-PB pairs) waiting to be flushed to any LBA in the specified LBA range.

The buckets may have different numbers of entries of PDESC-PB pairs depending on the write I/O pattern and hash function. There may be times during runtime when flushing where a large bucket may include a number of PDESC-PB pairs exceeding a specified maximum size or number of PDESC-PB pairs. For example, a large burst of writes may be issued at a point in time to the same LBA range associated with the same MID MD page. The large burst of writes may be recorded in a set of the PDESC-PB pairs of the log. Subsequently, the logged burst of writes recorded as the set of the PDESC-PB pairs of the log may be flushed to non-volatile storage locations on one or more BE PDs. In connection with flushing, pending unflushed PDESC-PB pairs of the log may be partitioned into buckets. In particular, as part of processing performed in connection with flushing the log, the set of the PDESC-PB pairs for writes to LBAs associated with the same MID MD page may be included in the same bucket where this bucket exceeds the maximum size.

In response to determining at runtime that the number of PDESC-PB pairs of a bucket exceeds the maximum size, processing may be performed to divide the bucket into multiple sub buckets and have a sub bucket BHFS persisted for each sub bucket. Thus, the bucket may be dynamically partitioned at run time during flushing (e.g., on-demand) into multiple sub buckets when the number of entries in the bucket exceeds the maximum size. In such an embodiment, the BHFS values for the sub buckets may be maintained and persistently stored, for example, in the log or NVRAM drives. For example, the sub bucket BHFS values may be persistently stored to the predefined location on the NVRAM drives as discussed herein for the BHFS values of the buckets. In the event of a system crash or failure, recovery processing may utilize the sub bucket level BHFS values along with the bucket level BHFS values. The sub bucket BHFS values may be processed and used in a manner similar to that as described herein for a bucket level BHFS value. For example, a sub bucket BHFS may be persistently stored for a particular sub bucket at a particular point in time where all PDESC-PB pairs of the sub bucket flushed up to the particular point in time have associated sequence IDs that are less than the sub bucket BHFS. The sub buckets may be flushed independently in a manner similar to the way in which buckets are flushed independently of one another so long as any time order dependency denoted by the increasing sequence IDs of the PDESC-PB pairs is maintained.

In at least one embodiment, the techniques as described in connection with FIG. 4 may be used in combination with one or more other techniques. In such an embodiment, the processing as described in connection with FIG. 4 may be used in combination with the first solution noted above providing explicit invalidation of the PDESC. In such an embodiment, the techniques as described in connection with FIG. 4 may be performed as part of the normal processing in a system. At times deemed urgent, the first solution may be performed for possibly faster reclamation of single PBs. For example, the first solution may be performed responsive to determining that the amount or number of free PBs in the PB pool available for reuse is below a specified threshold.

An embodiment in accordance with the techniques herein may implement the PDESC as a ring buffer as described above. More generally, the PDESC may also be implemented using any suitable structure besides the ring buffer.

Figure 5:
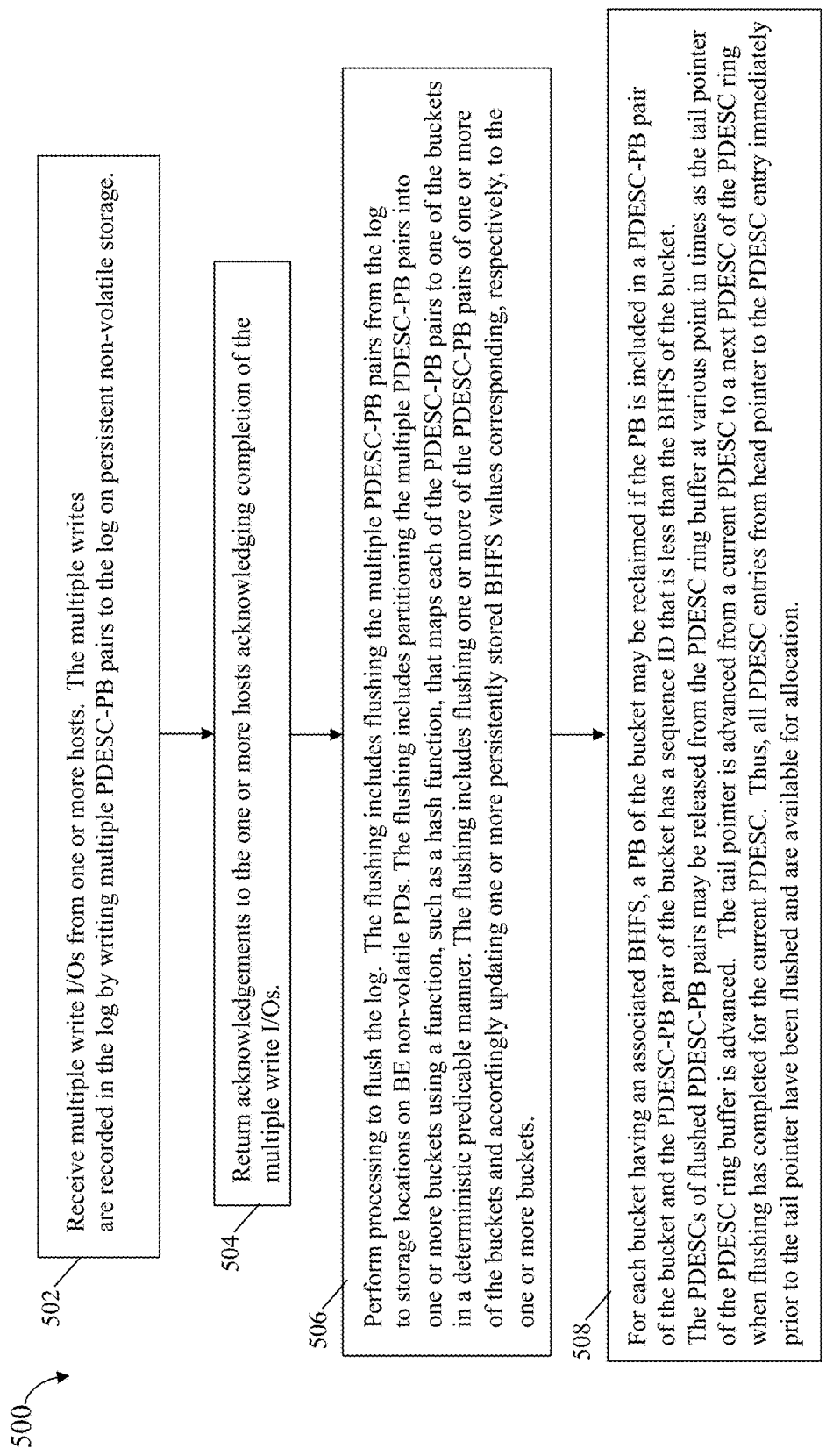
FIGS. 5 and 6 are flowcharts of processing steps that may be performed in an embodiment in accordance with the techniques herein.
Figure 6:
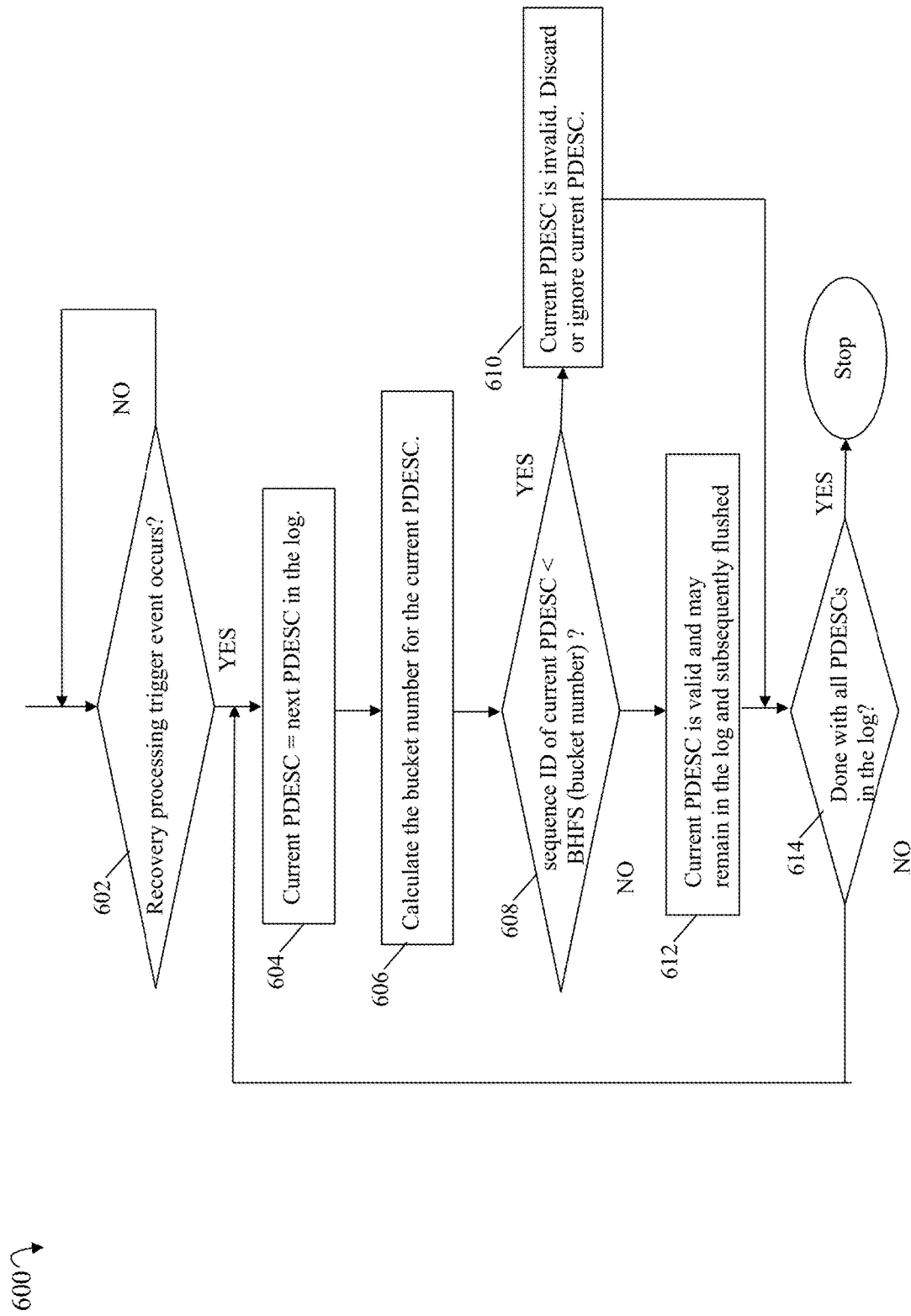

What will now be described in connection with FIGS. 5 and 6 are flowcharts of processing steps that may be performed in an embodiment in accordance with the techniques herein. The flowcharts 500, 600 respectively of FIGS. 5 and 6 summarize processing described above.

Referring to FIG. 5, shown is the first flowchart 500 of processing steps that may be performed in an embodiment in accordance with the techniques herein.

At a step 502, multiple write I/Os may be received from one or more hosts. The multiple writes may be recorded in the log by writing multiple PDESC-PB pars to the log stored on persistent non-volatile storage. From the step 502, control proceeds to a step 504.

At the step 504, processing is performed to return acknowledgements to the one or more hosts acknowledging successful completion of the one or more write I/Os. From the step 504, control proceeds to a step 506.

At the step 506, processing is performed to flush the log. The flushing includes flushing the multiple PDESC-PB pairs from the log to storage locations on BE non-volatile PDs. The flushing includes partitioning the multiple PDESC-PB pairs into one or more buckets using a function, such as a hash function, that maps each of the PDESC-PB pairs to one of the buckets in a deterministic predicable manner. The flushing includes flushing one or more of the PDESC-PB pairs of one or more of the buckets and accordingly updating one or more persistently stored BHFS values corresponding, respectively, to the one or more buckets. From the step 506, control proceeds to a step 508.

At the step 508, for each bucket having an associated BHFS, a PB of the bucket may be reclaimed if the PB is included in a PDESC-PB pair of the bucket and the PDESC-PB pair of the bucket has a sequence ID that is less than the BHFS of the bucket. The PDESCs of flushed PDESC-PB pairs may be released from the PDESC ring buffer at various point in times as the tail pointer of the PDESC ring buffer is advanced. The tail pointer is advanced from a current PDESC to a next PDESC of the PDESC ring when flushing has completed for the current PDESC. Thus, all PDESC entries from head pointer to the PDESC entry immediately prior to the tail pointer have been flushed and are available for allocation. Thus, in the step 508, PBs may be reclaimed for reuse at the per bucket level of granularity depending the particular flushing rate of each of the buckets.

Referring to FIG. 6, shown is the second flowchart 600 of processing steps that may be performed in an embodiment in accordance with the techniques herein. Generally, FIG. 6 includes steps of recovery processing that may be performed in response to an event such as a system crash or failure. Responsive to this event occurring, recovery processing may be performed that includes traversing the PDESCs in the log to detect which of the PDESCs of the log, if any, are invalid. The detection of an invalid PDESC may be performed using the sequence ID of the PDESC and the BFHS of a bucket mapped to the PDESC.

At a step 602, a determination is made as to whether a recovery processing trigger event has occurred. If the step 602 evaluates to no, control returns to the step 602. Control remains at the step 602 until the step 602 evaluates to yes. Responsive to the step 602 evaluating to yes, control proceeds to the step 602.

At the step 604, current PDESC may be assigned the next PDESC in the log. The current PDESC denotes a particular one of the PDESC of the log currently being processed for an invalidity determination. From the step 604, control proceeds to a step 606.

At the step 606, the bucket number B for the current PDESC is determined. As described herein, B may be calculated using the hash function or other function also used to map each PDESC-PB pair to a particular bucket number during flushing. From the step 606, control proceeds to a step 608.

At the step 608, the sequence ID of the current PDESC is compared to the BHFS of the calculated bucket number B. At the step 608, a determination is made as whether the sequence ID of the current PDESC is less than the BHFS of the bucket B. If the step 608, evaluates to yes, control proceeds to a step 610 where the current PDESC is determined to be invalid. In this case, the invalid PDESC of the log may be discarded or ignored and not further processed in connection with subsequent flushing. From the step 610, control proceeds to a step 614.

If the step 610 evaluates to no, control proceeds to the step 612 where the current PDESC is determined as valid and may remain in the log and be subsequently flushed from the log. From the step 612 control proceeds to a step 614.

At the step 614, a determination is made as to whether all PDESCs in the log have been processed by recovery processing. If the step 614 evaluates to yes, processing stops. Otherwise, if the step 614 evaluates to no, control proceeds to the step 604 to process the next PDESC of the log.

The techniques herein may be performed by any suitable hardware and/or software. For example, techniques herein may be performed by executing code which is stored on any one or more different forms of computer-readable media, where the code may be executed by one or more processors, for example, such as processors of a computer or other system, an ASIC (application specific integrated circuit), and the like. Computer-readable media may include different forms of volatile (e.g., RAM) and non-volatile (e.g., ROM, flash memory, magnetic or optical disks, or tape) storage which may be removable or non-removable.

While the invention has been disclosed in connection with embodiments shown and described in detail, their modifications and improvements thereon will become readily apparent to those skilled in the art. Accordingly, the spirit and scope of the present invention should be limited only by the following claims.

What is claimed is:

1. A method of processing requests comprising:
receiving a plurality of write operations at a data storage system;
performing first processing to record the plurality of write operations in a log, wherein the first processing includes:
storing a plurality of page descriptor (PDESC)-page block (PB) pairs in the log, where each of the plurality of write operations is recorded in the log by a corresponding one of the plurality of PDESC-PB pairs, wherein for said each write operation that writes first data to a target logical address, the corresponding one of the plurality of PDESC-PB pairs includes a PB storing the first data and includes a PDESC comprising the target logical address, a pointer or reference to the PB of the corresponding one of the PDESC-PB pair, and a sequence identifier (ID); and
flushing the log, wherein said flushing the log includes:
determining a working set of PDESC-PB pairs, wherein the working set of PDESC-PB pairs includes the plurality of PDESC-PB pairs;
partitioning the working set into a plurality of buckets, wherein each PDESC-PB pair of the working set is mapped to one of the plurality of buckets;
flushing a first portion of the plurality of PDESC-PB pairs included in a first of the plurality of buckets;
updating, at a point in time, a first of a plurality of BHFS (bucket highest flushed sequence ID) values for the first bucket, wherein the first BHFS denotes a first sequence ID and each sequence ID associated with a PDESC-PB pair of the first portion flushed prior to the point in time is less than the first sequence ID; and
reclaiming PBs of the first portion for reuse, wherein each PB reclaimed is included in a PDESC-PB pair of the first portion.

2. The method of claim 1, wherein the plurality of BHFS values is persistently stored on non-volatile storage.

3. The method of claim 2, wherein each of the plurality of BHFS values is associated with one of the plurality of buckets, and said each BHFS value associated with the one bucket indicates that a highest sequence number of any PDESC-PB pair of the one bucket that has been flushed is less than said each BHFS value.

4. The method of claim 3, wherein said each BHFS associated with the one bucket has a value that is one more than the highest sequence number of any PDESC-PB pair of the one bucket that has been flushed.

5. The method of claim 1, wherein a hash function is used to map each PDESC-PB pair of the working set to one of the plurality of buckets.

6. The method of claim 5, wherein the hash function maps a logical block address (LBA) or offset of a logical device to one of the plurality of buckets.

7. The method of claim 6, wherein the hash function is used to map the LBA or offset of the target logical address of each PDESC-PB pair to one of the plurality of buckets.

8. The method of claim 5, wherein a metadata structure of mapping information is used to map logical addresses to corresponding physical storage locations including content stored at the logical addresses.

9. The method of claim 8, wherein the hash function maps particular PDESC-PB pairs associated with a same metadata page of the metadata structure into a same one of the plurality of buckets, and wherein each PB of the particular PDESC-PB pairs includes content stored at an LBA or logical address associated with the same metadata page in the metadata structure.

10. The method of claim 1, wherein the log is stored on one or more non-volatile physical storage devices.

11. The method of claim 1, wherein the plurality of buckets includes a second bucket, and the method includes determining that the second bucket includes a number of PDESC-PB pairs that exceeds a maximum.

12. The method of claim 11, further comprising:
responsive to determining the second bucket exceeds the maximum, partitioning the second bucket into a plurality of sub buckets.

13. The method of claim 12, further comprising persistently storing a plurality of sub bucket BHFS values, wherein each of the plurality of sub buckets is associated with one of the plurality of sub bucket BHFS values.

14. The method of claim 13, wherein the one sub bucket BHFS value associated with said each sub bucket denotes an integer that is one more than a highest sequence ID of a PDESC-PB pair that has been flushed from said each sub bucket.

15. The method of claim 13, wherein H denotes a highest sequence ID of a PDESC-PB pair that has been flushed from said each sub bucket, and wherein the one sub bucket BHFS value associated with said each sub bucket denotes a next sequence ID that is greater than H in a sequence.

16. The method of claim 1, where the log is stored on non-volatile storage, wherein the data storage system experiences an event triggering recovery processing, and wherein said recovery processing includes detecting whether any of the plurality of PDESC-PB pairs of the log are inconsistent.

17. The method of claim 16, where said detecting whether any of the plurality of PDESC-PB pairs of the log are inconsistent further comprises:
reading a first PDESC-PB pair of the plurality of PDESC-PB pairs from the non-volatile storage;
mapping, in accordance with a function, the first PDESC-PB pair to the first bucket;
determining whether a particular sequence ID included in the PDESC of the first PDESC-PB pair is less than the first BHFS for the first bucket; and
responsive to determining that the particular sequence ID is less than the first BHFS, determining that the first PDESC-PB pair is invalid.

18. The method of claim 16, wherein the event triggering said recover processing is an occurrence of a system failure or crash.

19. A system comprising:
one or more processors; and
one or more memories comprising code stored thereon that, when executed, performs a method of processing requests comprising:
receiving a plurality of write operations at a data storage system;
performing first processing to record the plurality of write operations in a log, wherein the first processing includes:
storing a plurality of page descriptor (PDESC)-page block (PB) pairs in the log, where each of the plurality of write operations is recorded in the log by a corresponding one of the plurality of PDESC-PB pairs, wherein for said each write operation that writes first data to a target logical address, the corresponding one of the plurality of PDESC-PB pairs includes a PB storing the first data and includes a PDESC comprising the target logical address, a pointer or reference to the PB of the corresponding one of the PDESC-PB pair, and a sequence identifier (ID); and flushing the log, wherein said flushing the log includes:
  determining a working set of PDESC-PB pairs, wherein the working set of PDESC-PB pairs includes the plurality of PDESC-PB pairs;
  partitioning the working set into a plurality of buckets, wherein each PDESC-PB pair of the working set is mapped to one of the plurality of buckets;
  flushing a first portion of the plurality of PDESC-PB pairs included in a first of the plurality of buckets;
  updating, at a point in time, a first of a plurality of BHFS (bucket highest flushed sequence ID) values for the first bucket, wherein the first BHFS denotes a first sequence ID and each sequence ID associated with a PDESC-PB pair of the first portion flushed prior to the point in time is less than the first sequence ID; and
  reclaiming PBs of the first portion for reuse, wherein each PB reclaimed is included in a PDESC-PB pair of the first portion.

20. A computer readable medium comprising code stored thereon that, when executed, performs a method of processing requests comprising:
  receiving a plurality of write operations at a data storage system;
  performing first processing to record the plurality of write operations in a log, wherein the first processing includes:
    storing a plurality of page descriptor (PDESC)-page block (PB) pairs in the log, where each of the plurality of write operations is recorded in the log by a corresponding one of the plurality of PDESC-PB pairs, wherein for said each write operation that writes first data to a target logical address, the corresponding one of the plurality of PDESC-PB pairs includes a PB storing the first data and includes a PDESC comprising the target logical address, a pointer or reference to the PB of the corresponding one of the PDESC-PB pair, and a sequence identifier (ID); and
  flushing the log, wherein said flushing the log includes:
    determining a working set of PDESC-PB pairs, wherein the working set of PDESC-PB pairs includes the plurality of PDESC-PB pairs;
    partitioning the working set into a plurality of buckets, wherein each PDESC-PB pair of the working set is mapped to one of the plurality of buckets;
    flushing a first portion of the plurality of PDESC-PB pairs included in a first of the plurality of buckets;
    updating, at a point in time, a first of a plurality of BHFS (bucket highest flushed sequence ID) values for the first bucket, wherein the first BHFS denotes a first sequence ID and each sequence ID associated with a PDESC-PB pair of the first portion flushed prior to the point in time is less than the first sequence ID; and
    reclaiming PBs of the first portion for reuse, wherein each PB reclaimed is included in a PDESC-PB pair of the first portion.

\* \* \* \* \*

UNITED STATES PATENT AND TRADEMARK OFFICE
CERTIFICATE OF CORRECTION

| | | |
|---|---|---|
| PATENT NO. | : 11,340,829 B1 | Page 1 of 1 |
| APPLICATION NO. | : 17/191759 | |
| DATED | : May 24, 2022 | |
| INVENTOR(S) | : Vladimir Shveidel et al. | |

It is certified that error appears in the above-identified patent and that said Letters Patent is hereby corrected as shown below:

In the Claims

Column 34, Line 2:
In Claim 8, "stored at the logical addresses." should be corrected to read:
"stored at the logical addresses, and wherein the metadata structure includes a plurality of levels of metadata pages."

Signed and Sealed this
Twelfth Day of July, 2022

*Katherine Kelly Vidal*

Katherine Kelly Vidal
*Director of the United States Patent and Trademark Office*